US009005690B2

(12) United States Patent
Aldred et al.

(10) Patent No.: US 9,005,690 B2

(45) Date of Patent: Apr. 14, 2015

(54) AERATED PRODUCTS WITH REDUCED CREAMING

(75) Inventors: Deborah Lynne Aldred, Sharnbrook (GB); Andrew Richard Cox, Sharnbrook (GB); Simeon Dobrev Stoyanov, Vlaardingen (NL)

(73) Assignee: Conopco, Inc., Englewood Cliffs, NJ (US)

(*) Notice: Subject to any disclaimer, the term of this patent is extended or adjusted under 35 U.S.C. 154(b) by 2082 days.

(21) Appl. No.: 11/524,977

(22) Filed: Sep. 21, 2006

(65) Prior Publication Data

US 2007/0116848 A1 May 24, 2007

(30) Foreign Application Priority Data

Sep. 23, 2005 (EP) .................................... 05255944

(51) Int. Cl.

*A23L 1/00* (2006.01)
*A23J 3/20* (2006.01)
*A23L 2/66* (2006.01)
*A23C 9/154* (2006.01)
*A23G 9/34* (2006.01)
*A23G 9/38* (2006.01)
*A23L 1/305* (2006.01)
*A23L 2/54* (2006.01)

(52) U.S. Cl.

CPC ................ *A23L 2/66* (2013.01); *A23C 9/1544* (2013.01); *A23G 9/34* (2013.01); *A23G 9/38* (2013.01); *A23L 1/0097* (2013.01); *A23L 1/305* (2013.01); *A23L 2/54* (2013.01)

(58) Field of Classification Search

None

See application file for complete search history.

(56) References Cited

U.S. PATENT DOCUMENTS

| | | | |
|---|---|---|---|
| 2,604,406 | A | 7/1952 | Blihovde |
| 2,844,470 | A | 7/1958 | Akerboom et al. |
| 2,937,093 | A | 5/1960 | Gorman et al. |
| 2,970,917 | A | 2/1961 | Melnick |
| 3,266,214 | A | 8/1966 | Kramme |
| 3,346,387 | A | 10/1967 | Moncrieff et al. |
| 3,914,441 | A | 10/1975 | Finney et al. |
| 3,946,122 | A | 3/1976 | Scharp |
| 4,012,533 | A | 3/1977 | Jonas |
| 4,066,794 | A | 1/1978 | Schur |
| 4,146,652 | A | 3/1979 | Kahn et al. |
| 4,305,964 | A | 12/1981 | Moran et al. |
| 4,325,980 | A | 4/1982 | Rek et al. |
| 4,425,369 | A | 1/1984 | Sakamoto et al. |

(Continued)

FOREIGN PATENT DOCUMENTS

| | | |
|---|---|---|
| CA | 1094866 | 2/1981 |
| CA | 1218557 | 11/2004 |

(Continued)

OTHER PUBLICATIONS

Hakanpaa et al. "Atomic Resolution Structure of the HFBII Hydrophobin, a Self Assembling Amphiphile" 2003, The Journal of Biological Chemistry, vol. 279, 534-539.*

(Continued)

*Primary Examiner* — Felicia King

(74) *Attorney, Agent, or Firm* — Alan A. Bornstein

(57) ABSTRACT

A flowable aerated composition is provided which comprises hydrophobin and a yield stress agent, the composition having a continuous phase viscosity, measured at a shear rate of 10 $s^{-1}$, of from 0.01 to 2000 Pa s, and a continuous phase apparent yield stress of at least 4 Pa.

33 Claims, 6 Drawing Sheets

(56) References Cited

U.S. PATENT DOCUMENTS

| | | | | | |
|---|---|---|---|---|---|
| 4,542,035 | A | | 9/1985 | Huang et al. | |
| 4,627,983 | A | | 12/1986 | Scharf et al. | |
| 4,629,628 | A | | 12/1986 | Negro | |
| 4,668,519 | A | | 5/1987 | Dartey et al. | |
| 4,869,915 | A | | 9/1989 | Inayoshi et al. | |
| 4,874,627 | A | | 10/1989 | Greig et al. | |
| 4,946,625 | A | | 8/1990 | O'Lenick | |
| 4,954,440 | A | * | 9/1990 | Johal et al. | 435/101 |
| 4,960,540 | A | | 10/1990 | Friel et al. | |
| 5,084,295 | A | | 1/1992 | Whalen et al. | |
| 5,104,674 | A | | 4/1992 | Chen et al. | |
| 5,202,147 | A | | 4/1993 | Traska et al. | |
| 5,208,028 | A | | 5/1993 | Clement et al. | |
| 5,215,777 | A | | 6/1993 | Asher et al. | |
| 5,336,514 | A | | 8/1994 | Jones et al. | |
| 5,393,549 | A | | 2/1995 | Badertscher et al. | |
| 5,397,592 | A | | 3/1995 | Vermaas et al. | |
| 5,436,021 | A | | 7/1995 | Bodor et al. | |
| 5,486,372 | A | | 1/1996 | Martin et al. | |
| 5,536,514 | A | | 7/1996 | Bishay et al. | |
| 5,620,732 | A | | 4/1997 | Clemmings et al. | |
| 5,624,612 | A | * | 4/1997 | Sewall et al. | 264/4.1 |
| 5,681,505 | A | | 10/1997 | Phillips et al. | |
| 5,738,897 | A | | 4/1998 | Gidley | |
| 5,770,248 | A | | 6/1998 | Liebfred et al. | |
| 5,980,969 | A | | 11/1999 | Mordini et al. | |
| 6,096,867 | A | | 8/2000 | Byass et al. | |
| 6,187,365 | B1 | | 2/2001 | Vaghela et al. | |
| 6,238,714 | B1 | | 5/2001 | Binder et al. | |
| 6,284,303 | B1 | | 9/2001 | Rowe et al. | |
| 6,497,913 | B1 | | 12/2002 | Gray et al. | |
| 6,579,557 | B1 | | 6/2003 | Benjamins et al. | |
| 6,685,977 | B1 | | 2/2004 | Asano et al. | |
| 6,914,043 | B1 | | 7/2005 | Chapman et al. | |
| 7,338,779 | B1 | | 3/2008 | Nakari-Setala et al. | |
| 8,038,740 | B2 | | 10/2011 | Subkowski et al. | |
| 8,206,770 | B2 | | 6/2012 | Aldred et al. | |
| 8,216,624 | B2 | | 7/2012 | Berry et al. | |
| 2001/0048962 | A1 | | 12/2001 | Fenn et al. | |
| 2002/0085987 | A1 | | 7/2002 | Brown et al. | |
| 2002/0155208 | A1 | | 10/2002 | Benjamins et al. | |
| 2002/0182300 | A1 | | 12/2002 | Groh et al. | |
| 2002/0197375 | A1 | | 12/2002 | Adolphi et al. | |
| 2003/0087017 | A1 | | 5/2003 | Hanselmann et al. | |
| 2003/0099751 | A1 | * | 5/2003 | Aldred et al. | 426/565 |
| 2003/0134025 | A1 | | 7/2003 | Vaghela et al. | |
| 2003/0148400 | A1 | | 8/2003 | Haikara et al. | |
| 2003/0166960 | A1 | | 9/2003 | DeVocht et al. | |
| 2003/0175407 | A1 | | 9/2003 | Kunst et al. | |
| 2003/0190402 | A1 | | 10/2003 | McBride | |
| 2004/0109930 | A1 | | 6/2004 | Hooft et al. | |
| 2004/0161503 | A1 | | 8/2004 | Malone et al. | |
| 2004/0185162 | A1 | | 9/2004 | Finnigan et al. | |
| 2005/0037110 | A1 | | 2/2005 | Windhab et al. | |
| 2005/0123666 | A1 | | 6/2005 | Vaghela et al. | |
| 2005/0123668 | A1 | | 6/2005 | Kodali et al. | |
| 2005/0129810 | A1 | | 6/2005 | Lindner et al. | |
| 2005/0193744 | A1 | | 9/2005 | Cockings et al. | |
| 2005/0220961 | A1 | | 10/2005 | Cox et al. | |
| 2006/0024417 | A1 | | 2/2006 | Berry et al. | |
| 2006/0024419 | A1 | | 2/2006 | Aldred et al. | |
| 2007/0014908 | A1 | | 1/2007 | Bramley et al. | |
| 2007/0286936 | A1 | | 12/2007 | Bramley et al. | |
| 2007/0298490 | A1 | | 12/2007 | Sweigard et al. | |
| 2008/0187633 | A1 | | 8/2008 | Cox | |
| 2008/0254180 | A1 | | 10/2008 | Windhab et al. | |
| 2008/0305237 | A1 | | 12/2008 | Beltman et al. | |
| 2009/0136433 | A1 | | 5/2009 | Subkowski et al. | |

FOREIGN PATENT DOCUMENTS

| | | | | | |
|---|---|---|---|---|---|
| CA | 2575325 | | | 2/2006 | |
| DE | 297 15519 | | | 11/1997 | |
| EA | EP0995685 | | | 4/2003 | |
| EP | 216270 | | | 4/1987 | |
| EP | 0274348 | | | 7/1988 | |
| EP | 0285198 | | | 10/1988 | |
| EP | 0322952 | A2 | | 7/1989 | |
| EP | 0426211 | | | 5/1991 | |
| EP | 0469656 | | | 2/1992 | |
| EP | 0521543 | | | 1/1993 | |
| EP | 0477825 | B1 | | 12/1996 | |
| EP | 0775444 | A1 | | 5/1997 | |
| EP | 0777969 | A1 | | 6/1997 | |
| EP | 0930017 | A1 | | 7/1999 | |
| EP | 1061006 | | | 12/2000 | |
| EP | 1074181 | A1 | | 2/2001 | |
| EP | 0747301 | | | 8/2001 | |
| EP | 747301 | | | 8/2001 | |
| EP | 919134 | | | 11/2001 | |
| EP | 0771531 | B1 | | 9/2002 | |
| EP | 1284106 | | | 2/2003 | |
| EP | 995685 | | | 4/2003 | |
| EP | 0777 969 | B1 | * | 7/2003 | A23C 9/154 |
| EP | 1327390 | A1 | | 7/2003 | |
| EP | 1400486 | | | 3/2004 | |
| EP | 1520483 | | | 4/2005 | |
| EP | 1520484 | | | 4/2005 | |
| EP | 1520484 | A1 | | 4/2005 | |
| EP | 1520485 | | | 4/2005 | |
| EP | 1557092 | | | 7/2005 | |
| EP | 1449441 | | | 12/2005 | |
| EP | 1621084 | | | 2/2006 | |
| EP | 1623631 | A1 | | 2/2006 | |
| EP | 1849461 | A1 | | 10/2007 | |
| EP | 1938697 | | | 7/2008 | |
| EP | 1061006 | | | 8/2008 | |
| EP | 1400486 | | | 3/2011 | |
| GB | 459583 | | | 1/1937 | |
| GB | 1556297 | | | 11/1979 | |
| JP | 50-5596 | | | 1/1975 | |
| JP | 61219342 | | | 9/1986 | |
| JP | 3244348 | A | | 10/1991 | |
| JP | 5503426 | | | 6/1993 | |
| JP | 08500486 | | | 1/1996 | |
| JP | 2002508303 | | | 12/1998 | |
| JP | 2005278484 | | | 10/2005 | |
| WO | WO9013571 | | | 11/1990 | |
| WO | WO9222581 | | | 12/1992 | |
| WO | WO9403617 | | | 2/1994 | |
| WO | WO9412050 | | | 6/1994 | |
| WO | WO9413154 | | | 6/1994 | |
| WO | 94/13154 | | | 8/1994 | |
| WO | WO9523843 | | | 9/1995 | |
| WO | WO9611586 | | | 4/1996 | |
| WO | WO9621362 | | | 7/1996 | |
| WO | WO 96/39878 | | | 12/1996 | |
| WO | WO 96/41882 | | | 12/1996 | |
| WO | WO9804699 | | | 2/1998 | |
| WO | WO9937673 | | | 7/1999 | |
| WO | WO 99/54725 | | | 10/1999 | |
| WO | 00/22936 | | | 4/2000 | |
| WO | WO0022936 | | | 4/2000 | |
| WO | WO 00/38547 | | | 7/2000 | |
| WO | WO 00/53027 | | | 9/2000 | |
| WO | WO 00/58342 | | | 10/2000 | |
| WO | WO 01/14521 | | | 3/2001 | |
| WO | WO0135756 | A1 | | 5/2001 | |
| WO | WO 01/57076 | | | 8/2001 | |
| WO | WO 01/74864 | A1 | | 10/2001 | |
| WO | WO 01/83534 | | | 11/2001 | |
| WO | WO0184945 | A1 | | 11/2001 | |
| WO | WO03015530 | A1 | | 2/2003 | |
| WO | WO03051136 | A1 | | 6/2003 | |
| WO | WO 03/053383 | | | 7/2003 | |
| WO | WO03053883 | | | 7/2003 | |
| WO | 03/096821 | | | 11/2003 | |
| WO | WO03096821 | | | 11/2003 | |
| WO | WO 2005/058055 | | | 6/2005 | |
| WO | WO2005058055 | | | 6/2005 | |
| WO | WO2005058067 | A1 | | 6/2005 | |
| WO | 2005/102067 | | | 11/2005 | |
| WO | WO2005102067 | | | 11/2005 | |

(56) References Cited

FOREIGN PATENT DOCUMENTS

| | | | |
|---|---|---|---|
| WO | WO2005113387 A2 | 12/2005 |
| WO | WO 2006/010425 A1 | 2/2006 |
| WO | WO 2006/010426 A1 | 2/2006 |
| WO | 2005/113367 | 11/2006 |
| WO | WO2008031796 A1 | 3/2008 |
| WO | WO 2009/047657 | 4/2009 |
| WO | WO2010067059 A1 | 6/2010 |

OTHER PUBLICATIONS

Katzbauer 1998 "Properties and applications of xanthan gum" Polymer Degradation and Stability vol. 59 pp. 81-84.*
Lambou et al. 1973 "Whey Solids as Agricultural Foanm Stabilizers" Journal of Agriculture and Food Chemistry vol. 21 No. 2, pp. 257-263.*
Martin et al. 2000 "Sc3p Hydrophobin Organization in Aqueous Media and Assembly onto Surfaces as Mediated by the Associated Polysaccharide Schizophyllan" Biomacromolecules 1 (1) pp. 49-60.*
Sanderson, Jun. 1981 "Applications of Xanthan Gum" The British Polymer Journal vol. 13, . pp. 71-75.*
R.L. Cheer et al. "Effects of Sucrose on the Rheological Behavior of Wheat Starch Pastes" 1983 Journal of Applied Polymer Science vol. 28, 1829-1836.*
Light "Modified Starches: Why, What, Where and How" 1990 The American Association of Cereal Chemists vol. 35 No. 11 1-20 pages.*
European Search Report EP 05255943 dated Dec. 29, 2005.
European Search Report EP 05256960 dated Mar. 15, 2006.
European Search Report EP 05255944 dated Feb. 17, 2006.
Co-pending application WO 2006/010425 dated Feb. 2, 2006.
Woesten, "Hydrophobins, the fungal coat unravelled", Biochimica et Biophysica Acta. MR. Reviews on Biomembranes, Elsevier, Amsterdam, NL, vol. 1469, No. 2, Sep. 18, 20000, XP004281756.
Lindner et al., "Hydrophobins: the protein-amphiphiles of filamentous fungi", Fems Microbiology Reviews, Elsevier, Amsterdam, NL, vol. 29, No. 5, Nov. 2005, pp. 877-896, XP005107912.
Van der Werf, "Surface Active Proteins", Leads in Life Science, Jul. 2000:5.
Co-pending application Aldred et al., U.S. Appl. No. 12/287,957, filed Oct. 15, 2008.
Co-pending application Aumaitre et al., U.S. Appl. No. 12/409,549, filed Mar. 24, 2009.
International Search Report International Application No. PCT/EP2006/008992 completed Nov. 24, 2006.
International Search Report International Application No. PCT/EP2006/008993 completed Jan. 5, 2007.
Linder et al., "Hydrophobins: the protein-amphiphiles of filamentous fungi", Fems Microbiology Reviews, Elsevier, Amsterdam, NL, vol. 29, No. 5, Nov. 2005, pp. 877-896, XP005107912, reported to be first published online Mar. 5, 2005.
deVocht et al., "Structural Characterization of the Hydrophobin SC3, as a Monomer and after Self-Assembly at Hydrophobic/Hydrophilic Interfaces", Biophys. J. 74: pp. 2059-2068, 4/98.
Kilcast et al., "Sensory perception of creaminess and its relationship with food structure", Food Quality and Preference 13 (2002) 609-623.
Murray, "Stabilization of bubbles and foams", Current Opinion in Colloid & Interface Science 12 (2007) 232-241.
Minor et al., "Preparation and sensory perception of fat-free foams—effect of matrix properties and level of aeration", International Journal of Food Science and Technology, 2009, 44, 735-747.
Guner et al., "Production of yogurt ice cream at different acidity", International Journal of Food Science and Technology, 2007, 42, 948-952.
McCabe et al., "Secretion o f Cryparin, a Fungal Hydrophobin", Applied and Environmental Microbiology, Dec. 1999, vol. 65, No. 12, pp. 5431-5435.
Talbot, "Aerial Morphogenesis. Enter the Chaplin", Current Biology, vol. 13, R696-R698, Sep. 2003.
Calonje et al., "Properties of a hydrophobin isolated from the mycoparasitic fungus *Verticillium fungicola*", Can. J. Microbiol., 2002, 48: pp. 1030-1034.
Office Action dated Jun. 10, 2009 for Cox et al., U.S. Appl. No. 11/609,601, filed Jan. 30, 2007.
Office Action dated Jun. 26, 2009 for Cox et al., U.S. Appl. No. 11/699,602, filed Jan. 30, 2007.
Office Action dated Mar. 16, 2009 for Aldred et al., U.S. Appl. No. 11/168,214, filed Jun. 27, 2005.
Office Action dated Mar. 10, 2009 for Berry et al., U.S. Appl. No. 11/168,209, filed Jun. 27, 2005.
Linder et al., "The Hydrophobins HFBI and HFBII from *Trichoderma reesi* Showing Efficient Interactions with Nonionic Surfactants in Aqueous Two-Phase Systems", Biomacromolecules 2001, 2, 511-517.
Office Action dated Oct. 19, 2009 for Aldred et al., U.S. Appl. No. 11/168,214, filed Jun. 27, 2005.
Penttila et al., "Molecular Biology of *Trichoderma* and Biotechnological Applications", Handbook of Fungal Biotechnology, $2^{nd}$ Ed., vol. 20, 2004, pp. 413-427.
Arbuckle, Ice Cream, $2^{nd}$ Edition, AVI Publishing, 1972, pp. 284 and 285.
Fennema's Food Chemistry, $4^{th}$ Edition, CRC Press, 2008, pp. 727 and 728.
Dictionary.com, Stabilizer, pp. 1-5, print date Jun. 14, 2010.
Guargum.biz, Guar Gum, pp. 1-2, print date Jun. 14, 2010.
Office Action dated Jun. 23, 2010 for Bramley et al., U.S. Appl. No. 11/639,851.
Office Action dated Jun. 25, 2010 for Aldred et al., U.S. Appl. No. 11/168,214.
Office Action dated Jun. 17, 2010 for Berry et al., U.S. Appl. No. 11/168,209.
International Search Report International application No. PCT/EP2006/008989 mailed Apr. 12, 2006.
Database WPI, Section Ch, Week 200444, Derwent Publications Ltd., London, GB; AN 2004-465457, XP002313777 & KR 2004 018 844 A (Kim, J.G.), Mar. 4, 2004 abstract.
Scholmeijer et al, "Fungal Hydrophobins in Medical and Technical Applications", Applied Microbiology and Biotechnology, Springer Verlag, Berlin, DE, vol. 56, No. ½, Jul. 2001, pp. 1-8, XP001120015.
Russo et al., "The surface activity of the phytotoxin cerato-ulmin", 1982 National Research Council of Canada.
Teodora Gliga, article available on the Internet at least as of May 29, 2007 regarding hydrophobins.
Office Action dated Dec. 30, 2010 for Bramley et al., U.S. Appl. No. 11/639,851, filed Dec. 15, 2006.
Office Action dated Dec. 29, 2010 for Burmester et al., U.S. Appl. No. 12/002,684, filed Dec. 18, 2007.
Office Action dated Sep. 13, 2010 for Aldred et al., U.S. Appl. No. 11/525,060, filed Sep. 21, 2006.
Office Action dated Sep. 13, 2010 for Cox et al., U.S. Appl. No. 11/524,675, filed Sep. 21, 2006.
Office Action dated Dec. 7, 2010 for Cox et al., U.S. Appl. No. 11/699,601, filed Jan. 30, 2007.
Office Action dated Oct. 8, 2010 for Cox, U.S. Appl. No. 11/699,602, filed Jan. 30, 2007.
Arbuckle, 1972, Ice Cream, Ice Cream, 2nd Edition, pp. 15, 18, 35, 61, 65.
Kinderlerer, 1997, *Chrysosporium* species, potential spoilage organisms of chocolate, Journal of Applied Microbiology, vol. 83, pp. 771-778.
Pardun, 1977, Soy Protein Preparations as Antispattering Agents for Margarine, Fette Seifen Anstrichmittel, vol. 79, No. 5, pp. 195-203, Abstract only in english.
Samsudin, May 26, 2010, Low-Fat Chocolate Spread Based on Palm Oil, Malasyian Palm Oil Board, ., pp. 27-30.
Scott et al., 1983, Influence of Temperature on the Measurement of Water Activity of Food and Salt Systems, Journal of Food Science, vol. 48, pp. 552-554.
Mitchell et al., Co-Pending U.S. Appl. No. 13/498,157, filed Mar. 26, 2012.
Aldred et al., Co-Pending U.S. Appl. No. 13/378,143, filed Feb. 10, 2012.

(56) References Cited

OTHER PUBLICATIONS

Hedges et al., Co-Pending U.S. Appl. No. 12/636,157, filed Dec. 11, 2009.
Cox et al., Co-Pending U.S. Appl. No. 12/682,717, filed Apr. 12, 2010.
Aldred et al., Co-Pending U.S. Appl. No. 12/788,395, filed May 27, 2010.
Jan. 1, 2005, Fats Oils Fatty Acids Triglycerides, Scientific Psychic, *, 1-4.
Feb. 25, 2008, Research pushes the right buttons, mushrooms are the new fat, University of Birmingham, *, 1-2.
Arbuckle, Jan. 1, 1972, Ice Cream, Ice Cream 2nd Ed 1972 pp. 35 266 284-285, 2nd Edition, 35, 266, 284-285.
Arbuckle, 1972, Ice Cream, Ice Cream, 2nd Ed., 265, Avi Publishing Company.
Arbuckle, 1972, Ice Cream, Ice Cream, 2nd, 31.
Askolin, et al., Jan. 10, 2006, Interaction & comparison of a Class I Hydrophobin from schizophyllum commune & Class II Hydro form *Trichoderma reesei*, Biomacromolecules, 7, 1295-1301.
Chaisalee, et al., Oct. 1, 2003, Mechanism of Antifoam Behavior of Solutions of Nonionic Surfactants Above the Cloud Point, Journal of Surfactants & Detergents, 6, No. 4, 345-351.
Chakraborty, et al., Jan. 1, 1972, Stabilization of Calcium Sensitive Plant Proteins by k-Carrageenan, Journal of Food Science, 37, 719-721.
CP Kelco US Inc., Apr. 17, 2007, Certificate of Analysis for Keltrol RD, CP Kelco, *, 1.
Cruse, May 26, 1970, Whipped Soup is Tasty, St. Petersburg Independent, ., B-4.
Davis, et al., Jan. 1, 2001, Application of foaming for the recovery of surfactin from *B. subtilis* ATCC 21332 cultures, Enzyme & Microbial Technology, 28, 346-354.
Dickinson, Dec. 2, 2010, Mixed biopolymers at interfaces: Competitive adsorption and multilayer structures, Food Hydrocolloids, 25, 1966-1983.
Fellows, 2000, Principles and Practice, Food processing technology, 2nd, 83, 140, 429, Foodhead Publishing.
Fox, 1992, Analytical methods for Milk Proteins, Advanced Dairy Chemistry 1: Proteins, 1, 1, 6-7.
Goh, Apr. 8, 2002, Applications and Uses of Palm and Palm Kernel Oils, Malaysian Oil Science and Technology, 11, 46-50.
Graham et al, Jul. 3, 1979, Proteins at Liquid Interfaces, Journal of Colloid and Interface Science, 70, 415-426.
Grant, Jan. 1, 1987, Grant & Hackh's Chemical Dictionary, McGraw-Hill, 5th Ed, 212.
Guinee et al., 2004, Salt in Cheese: Physical, Chemical and Biological Aspects, Cheese: Chemistry, Physics and Microbiology, vol. 1, 3rd ed., pp. 207-259.
Holmes, et al., Oct. 10, 2006, Evaluation of antifoams in the expression of a recombinant FC fusion protein in shake flask cultures, Microbial Cell Factories, 5, No. 1, P30.
Hui, Jan. 1, 1992, Encyclopedia of Food Science & Tehcnology, John Wiley & Sons, 1, 204-210.
Hung, et al., Aug. 20, 2007, Cloud-point extraction of selected polycyclic aromatic hydrocarbons by nonionic surfactants, Separation & Purification Tech, 57, 1-10.
Hunter, et al., Jan. 1, 2008, The role of particles in stabilising foams and emulsions, Advances in Colloid & Interface Science, 137, 57-81.
Lumsdon, et al., Sep. 1, 2005, Adsorption of hydrophobin proteins at hydrophobic & hydrophilic interfaces, Colloids & Surfaces, 44, 172-178.
Marshall, Jan. 1, 2003, Ice Cream, Springer, 6th Ed, 70-73.
Mathlouthi, et al., Jan. 1, 1995, Rheological properties of sucrose solutions and suspensions, Sucrose Properties & Applic, *, 126-154.
McGregor, et al., Jan. 1, 1988, Antifoam effects on ultrafiltration, Biotechnology & Bioengineering, 31, No. 4, 385-389.
Miquelim et al., 2010, pH Influence on the stability of foams with protein-polysaccharide complexes at their interfaces, Food Hydrocolloids, 24, No. 4, 398-405.
Nakari-Setala, et al., May 26, 1997, Differential expression of the vegetative and spore-bound hydrophobins of *Trichoderma reesei*, Eur J. Biochem, 248, 415-423.
Patino and Pilosof, 2011, Protein-polysaccharide interactions at fluid interfaces, Food Hydrocolloids, 25, 1925-1937.
Schmitt, Feb. 27, 2012, Declaration of Christophe Schmitt, Declaration of Christophe Schmitt, ., 1-4.
Sienkiewicz, Jan. 1, 1990, Whey and Whey Utilization, Verlag Th Mann, 2nd Ed, 82-83.
Swern, Jan. 1, 1979, Baileys Industrial Oil and Fat Products, John Wiley & Sons, 1, 369.
Takai, et al., Jan. 1, 1978, Cerato-ulmin, a wilting toxin of ceratocystis ulmi: isolation & some properties of cerato-ulmin from the culture of C. ulmi, Phytopath, 91, 129-146.
Talbot, et al., Jun. 1, 1996, MPG1 encodes a fungal hydrophobin involved in surface interactions during infection-related develop of *Magnaporthe grisea*, Plant Cell, 8, 985-999.
Temple, 2000, Biological Roles for cerato-Ulmin, a Hydrophobin secreted by the elm pathogens, Opthiostoma ulmi and O. novo-ulmi, Micological Society of America, 92, 1-9.
Wang et al, May 31, 2004, Protease a Stability of Beer Foam II, China Acadmic Journal Electronic Publishing House, ., 11-15.
Wosten, et al., Nov. 1, 1993, Interfacial self-assembly of a fungal hydrophobin into a hydrophobic rodlet layer, Plant Cell, 5, 1567-1574.
2012, West Search History for Application 12636157, Carbohydrates, 1-29.
Formo et al., 1979, Bailey Industrial Oil and Fat Products, Bailey's Industrial Oil and Fat Products, vol. 1, 4th edition, pp. 317, 326, 377, 382, 398.
Jackson, Apr. 16, 2008, Hard or Soft, red or White—or a blend?, Flour Power, pp. 1-4.
Response to Notice of Opposition, dated Oct. 29, 2010—Nestec S.A./Unilever N.V. (EP1926399).
Cox et al., Co-Pending U.S. Appl. No. 13/585,257, filed Aug. 14, 2012.
Office Action dated Jun. 26, 2009 for Cox, U.S. Appl. No. 11/699,602.
Office Action dated Mar. 17, 2010 for Cox, U.S. Appl. No. 11/699,602.
Office Action dated Jun. 10, 2009 for Cox et al., U.S. Appl. No. 11/699,601.
Office Action dated Dec. 28, 2009 for Cox et al., U.S. Appl. No. 11/699,601.
Office Action dated May 18, 2010 for Cox et al.., U.S. Appl. No. 11/699,601.
Office Action dated Feb. 18, 2010 for Cox et al., U.S. Appl. No. 11/524,675.
Office Action dated Dec. 18, 2009 for Cox et al., U.S. Appl. No. 11/524,675.
Office Action dated Feb. 23, 2009 for Aldred et al., U.S. Appl. No. 11/525,060.
Interview Summary dated Jul. 1, 2009 for Aldred et al., U.S. Appl. No. 11/525,060.
Supplemental Amendment dated Sep. 18, 2009 for Aldred et al., U.S. Appl. No. 11/525,060.
Office Action dated Feb. 5, 2010 for Aldred et al., U.S. Appl. No. 11/525,060.
Office Action dated Jan. 4, 2006 for Aldred et al., U.S. Appl. No. 11/168,214.
Office Action dated Aug. 8, 2006 for Aldred et al., U.S. Appl. No. 11/168,214.
Office Action dated Feb. 12, 2007 for Aldred et al., U.S. Appl. No. 11/168,214.
Office Action dated Sep. 25, 2007 for Aldred et al., U.S. Appl. No. 11/168,214.
Office Action dated Jul. 14, 2008 for Aldred et al., U.S. Appl. No. 11/168,214.
Interview Summary dated Jul. 15, 2008 for Aldred et al., U.S. Appl. No. 11/168,214.
Cox Declaration dated Jan. 13, 2009 for Aldred et al., U.S. Appl. No. 11/168,214.

(56) References Cited

OTHER PUBLICATIONS

Amendment dated Jan. 14, 2009 for Aldred et al., U.S. Appl. No. 11/168,214.
Amendment dated Mar. 18, 2010 for Aldred et al., U.S. Appl. No. 11/168,214.
Cox Declaration dated Mar. 18, 2010 for Aldred et al., U.S. Appl. No. 11/168,214.
Cox Declaration (2nd) dated Mar. 18, 2010 for Aldred et al., U.S. Appl. No. 11/168,214.
Office Action dated Sep. 8, 2006 for Berry et al., U.S. Appl. No. 11/168,209.
Office Action dated Apr. 17, 2007 for Berry et al., U.S. Appl. No. 11/168,209.
Office Action dated Jan. 18, 2008 for Berry et al., U.S. Appl. No. 11/168,209.
Interview Summary dated Jul. 15, 2008 for Berry et al., U.S. Appl. No. 11/168,209.
Amendment dated Jul. 18, 2008 for Berry et al., U.S. Appl. No. 11/168,209.
Cox Declaration dated Jan. 12, 2009 for Berry et al., S/N 168,209.
Amendment dated Jan. 23, 2009 for Berry et al., U.S. Appl. No. 11/168,209.
Office Action dated Dec. 18, 2009 for Berry et al., U.S. Appl. No. 11/168,209.
Interview Summary dated Jan. 26, 2010 for Berry et al., U.S. Appl. No. 11/168,209.
Cox Declaration dated May 18, 2010 for Berry et al., U.S. Appl. No. 11/168,209.
Office Action dated Dec. 1, 2009 for Bramley et al., U.S. Appl. No. 11/639,851.
Bailey et al., "Process technological effects of deletion and amplification of hydrophobins I and II in transformants of *Trichoderma reesi*", Appl. Microbiol. Biotechnol. (2002) 58:721-727.
Cover sheet and first page of D5 of Opposition—Nestec S.A./Unilever N.V. (EP 1926399), 2004.
Grounds of Opposition—Nestec S.A./Unilever N.V. (EP 1926399), 13 pages, Nov. 17, 2009.
PCT International Preliminary Report of Patentability International Application No. PCT/EP2006/008993 dated Dec. 17, 2007.
Communication pursuant to Article 94(3) EPC, Application No. 06 805 732.2-1221 dated Jul. 1, 2008.
Wosten et al., "Interfacial self-assembly of a hydrophobin into an emphipathic protein membrane mediates fungal attachment to hydrophobic surfaces", The EMBO Journal, vol. 13, No. 24, pp. 5848-5854, 1994.
Dr. E. Kolodziejcxzyk, "Adsorption of different proteins to Teflon sheets: Experimental results", Nestle Research Center, Nov. 16, 2009.
Damodaran, "Adsorbed layers formed from mixtures of proteins", Current Opinion in Colloid & Interface Science 9 (2004), 328-339.
Publication No. JP 61-293348, Dec. 1986—Patent Abstracts of Japan.
Publication No. JP 53006491, Jan. 1978—Patent Abstracts of Japan.
Publication No. JP 03164156, Jul. 1991—Patent Abstracts of Japan.
Haakanpaa et al., "Atomic Resolution Structure of the HFBII Hydrophobin, a Self-assembling Amphiphile", The Journal of Biological Chemistry, 2004, The American Society for Biochemistry and Molecular Biology, Inc., vol. 279, No. 1, Issue of Jan. 2, pp. 534-539.
Cox et al., Co-pending U.S. Appl. No. 12/578,752, filed Oct. 14, 2009.
Cox et al., Co-pending U.S. Appl. No. 12/532,670, filed Sep. 23, 2009.
Cox et al., Co-pending U.S. Appl. No. 12/532,667, filed Sep. 23, 2009.
Cox et al., Co-pending U.S. Appl. No. 12/780,294, filed May 14, 2010.
Cox et al., Co-pending U.S. Appl. No. 12/780,323, filed May 14, 2010.
Watts et al., Co-pending U.S. Appl. No. 12/788,419, filed May 27, 2010.
Bialek et al., Co-pending U.S. Appl. No. 11/643,586, filed Dec. 21, 2006.
Arora, "Handbook of fungal biotechnology", 2nd Edition, 2004, vol. 20, pp. 413-427.
Bay, "La Cucina Italiana", Pozzo Gros Monti S.p.A., 2002, p. 1233.
Beroizheimer, "Culinary Arts Institute Encyclopedic Cookbook", 1988, p. 648.
Nestle Research Center, Search Proteins Matching the Sequence Pattern used for the Hydrophpobin Definition in patent EP 1926399 B1, Oct. 16, 2009, 3 pp.
Nestle Research Center, Adsorption of different proteins to Teflon sheets: Experimental Results, Nov. 16, 2009, Dr. E. Kolodziejcxzyk, 10 pp.
Quintas, "Rheology of supersaturated sucrose solutions", Elsevier, Journal of Food Engineering 77 (2006), pp. 844-852.
Stringer, et al., "Cerato-ulmin, a Toxin involved in Dutch Elm Disease, is a Fungal Hydrophobin", The Plant Cell, Feb. 1993, pp. 145-146, Feb. 1993.
Whitcomb, "Rheology of Guar Solutions", 1980 John Wiley & Sons, Inc., Journal of Applied Polymer Science, vol. 25, pp. 2815-2827 (1980).
Wessels, "Fungal hydrophobins: proteins that function at an interface", Trends in Plant Science, Elsevier Science, Oxford GB, vol. 1, Jan. 1996, pp. 9-15.
Strirnger et al., "Cerato-ulmin, a Toxin Involved in Dutch Elm Disease, is a Fungal Hydrophobin", The Plant Cell, Feb. 1993, pp. 145-146.
Linder et al., "Hydrophobins: the protein-amphiphiles of filamentous fungi", FEMS Microbiology Reviews 29 (2005) 877-896.
Talbot, 2001 "7 Fungal Hydrophobins", The Mycota: a Comprehensive Treatise on fungi as Experimental systems for basic and applied research, Howard and Gow (Eds.), vol. 7: "Biology of the fungal cell" Springer-Verlag, Berline and Heidelbert GmbH and Co., pp. 145-159.
Kershaw et al., "Hydrophobins and Repellents: Proteins with Fundamental Roles in Fungal Morphogenesis", Fungal Genetics and Biology 23, 18-33 (1998).
Askolin et al., "Overproduction, purification, and characterization of the *Trichoderma reesei* hydrophobin HFBI", 2001, Appl. Microbiol. Biotechnol. 57: pp. 124-130.
Calonje et al., "Properties of a hydrophobin isolated from the mycoparasitic fungus *Verticillium fungicola*", Can. J. Microbiol. 48: pp. 1030-1034, 2002.
De Vries et al., "Identification and characterization of a tri-partite hydrophobin from *Claviceps fusiformis*", 1999, Eur. J. Biochem. 262: pp. 377-385.
Collen et al., "A novel two-step extraction method with detergent/polymer systems for primary recovery of the fusion protein endoglucanase I-hydrophobin I", 2002 Biochim Biophys. Acta. 1569: pp. 139-150.
deVocht et al., "Structural Characterization of the Hydrophobin SC3, as a Monomer and after Self-Assembly at Hydrophobic/Hydrophilic Interfaces", Biophys. J. 74: pp. 2059-2068, Apr. 1998.
Wessels, "Hydrophobins: Proteins that Change the Nature of the Fungal Surface", Advances in Microbial Physiology, Academic Press, London, GB, vol. 38, No. 38, 1997, pp. 1-45.
Wosten, "Hydrophobins: Multipurpose Proteins", Annu. Rev. Microbiol. 2001, 55:625-46.
Kloek et al., "Effect of Bulk and Interfacial Rheological Properties on Bubble Dissolution", Journal of Colloid and Interface Science 237, 158-166 (2001).
Soukoulis et al., "Impact of the acidification process, hydrocolloids and protein fortfliers on the physical and sensory properties of frozen yogurt", International Journal of Dairy Technology, vol. 61, No. 2, May 2008.
Cox et al., "Surface Properties of Class II Hydrophobins from *Trichoderma reesei* and Influence on Bubble Stability", Langmuir 2007, 23, 7995-8002.
Cox et al., "Exceptional stability of food foams using class II hydrophobin HFBII", Food Hyrdocolloids 23, (2009), 366-376.
Tchuenbou-Magaia et al., "Hydrophobins stabilized air-filled emulsions for the food industry", Food Hydrocolloids 23 (2009), 1877-1885.

(56) References Cited

OTHER PUBLICATIONS

Murray et al., "Foam stability: proteins and nanoparticles", Colloid & Interface Science 9 (2004), 314-320.

Gilga, article available on Internet at least as of May 29, 2007 regarding hydrophobins (original plus English language translation).

Burmester et al., Co-pending U.S. Appl. No. 12/002,684, filed Dec. 18, 2007.

Cox et al., Co-pending U.S. Appl. No. 11/699,601, filed Jan. 30, 2007.

Aldred et al., Co-pending U.S. Appl. No. 11/525,060, filed Sep. 21, 2006.

Bramley et al., Co-pending U.S. Appl. No. 11/639,851, filed Dec. 15, 2006.

Berry et al., Co-pending U.S. Appl. No. 11/168,209, filed Jun. 27, 2005.

Cox et al., Co-pending U.S. Appl. No. 11/524,675, Sep. 21, 2006.

Aldred et al., Co-pending U.S. Appl. No. 11/168,214, filed Jun. 27, 2005.

* cited by examiner

Time = 0 days

Time = 3 weeks

Time = 0 days

Time = 3 weeks

AERATED PRODUCTS WITH REDUCED CREAMING

FIELD OF THE INVENTION

The present invention relates to compositions, such as food products, that include hydrophobins, and which exhibit reduced creaming.

BACKGROUND TO THE INVENTION

A wide variety of foods contain an introduced gas such as air, nitrogen, carbon dioxide or nitrous oxide. Typically, food foams are unstable over periods of time in excess of several days (i.e. bubbles will grow and the foam will collapse) unless the product is frozen (e.g. ice cream) or unless the continuous phase of the product is gelled (e.g. mousse).

Currently, it is difficult to prepare an aerated product where the foam is stable over a shelf life of several weeks which, with some agitation if necessary, will then flow. There are two aspects that need to be considered: (a) the stability of the bubbles over several weeks; (b) prevention of the rise of air bubbles to the surface due to the buoyancy difference between the two phases (termed creaming). Creaming can lead to a poor appearance of a product and loss of performance. For example, if a foam creams then the bubbles can become less stable and air can be lost. Furthermore, a "phase separated" product can look much less desirable to the consumer.

Ideally, such an aerated product would contain a foam where the bubbles remain stable to growth and creaming, yet on application of a relatively small amount of agitation (e.g. shaking, stirring or sucking), the product will flow.

There are a number of mechanisms that degrade the quality of an aerated product: Disproportionation and coalescence lead to bubble growth, changing product properties, such as its texture and physical appearance. Creaming (due to the buoyancy of the air bubbles) leads to vertical phase separation in the container resulting in a large proportion of bubbles close to the upper surface and the depletion of bubbles at the bottom. There are aerated food products where creaming is desirable, e.g. the foam on the surface of beer. However, for aerated products requiring a foam life-time beyond a few minutes or hours (e.g. those requiring a shelf-life), creaming leads to an undesirable appearance. It can also lead to subsequent air loss due to the closer packing of the bubbles in the foam and the foam collapse that may result there from.

To design a product were creaming is prevented and the bubbles within the foam remain stable over an extended shelf-life (from 1 week to at least 3 or more weeks at chill), there are two pre-requisites: The continuous phase requires either an apparent yield stress or must be visco-elastic to prevent bubbles rising due to buoyancy. The bubbles within the foam must be stable to disproportionation and coalescence throughout the product life-time.

SUMMARY OF THE INVENTION

In our co-pending application WO 06/010425, we have found that a fungal protein termed hydrophobin allows the production of foam with excellent stability to disproportionation and coalescence. Hydrophobin is an aerating agent that we have found to provide excellent stability to the foam due to its surface active nature. Hydrophobin also appears to confer a highly viscoelastic nature to the surface of the air bubbles. This leads to good stability to disproportionation and coalescence.

We have now found that the use of hydrophobin in combination with stabilisers that provide an apparent yield stress to the continuous phase lead to aerated products that also show good stability to creaming in excess of 3 weeks when kept at chill temperatures. In contrast, a combination of stabilisers with other surface active agents, such as sodium caseinate, instead of hydrophobin did not result in a stable foam.

To slow the rate of creaming in a foam produced using hydrophobin as the surface active aerating agent, a continuous phase needs to be designed with a viscosity or yield stress. The former will only slow the rate of creaming (through Stoke's law), even if the viscosity is made very high. Use of a continuous phase with a yield stress, however, can lead to a situation where creaming is prevented, yet with a relatively small amount of agitation, the product will shear thin and flow.

Accordingly, the present invention provides a flowable aerated composition comprising hydrophobin and a yield stress agent, the composition having a continuous phase viscosity, measured at a shear rate of $10\ s^{-1}$, of from 0.01 to 2000 Pa s, and a continuous phase apparent yield stress of at least 4 Pa.

In one embodiment, the hydrophobin is in a substantially isolated form.

Preferably, the hydrophobin is present in an amount of at least 0.001 wt %, more preferably at least 0.01 wt %.

Preferably the hydrophobin is a class II hydrophobin.

In a preferred embodiment, the yield stress agent is a polysaccharide, more preferably a bacterial polysaccharide, such as xanthan and/or gellan.

In one embodiment, the aerated composition comprises a thickener.

In a preferred embodiment, the aerated composition is pourable.

Preferably the aerated composition is an aerated food product, such as a chilled food product.

In another aspect, the present invention provides the use of a hydrophobin and a yield stress agent for inhibiting creaming in a flowable aerated composition.

In a related aspect the present invention provides a method of inhibiting creaming in an aerated composition which method comprises adding hydrophobin and a yield stress agent to the composition prior to and/or during aeration of the composition.

DETAILED DESCRIPTION OF THE INVENTION

Unless defined otherwise, all technical and scientific terms used herein have the same meaning as commonly understood by one of ordinary skill in the art (e.g. in chilled confectionery/frozen confectionery manufacture, chemistry and biotechnology). Definitions and descriptions of various terms and techniques used in chilled/frozen confectionery manufacture are found in Ice Cream, 4th Edition, Arbuckle (1986), Van Nostrand Reinhold Company, New York, N.Y. Standard techniques used for molecular and biochemical methods can be found in Sambrook et al., Molecular Cloning: A Laboratory Manual, 3rd ed. (2001) Cold Spring Harbor Laboratory Press, Cold Spring Harbor, N.Y. and Ausubel et al., Short Protocols in Molecular Biology (1999) 4th Ed, John Wiley & Sons, Inc.—and the full version entitled Current Protocols in Molecular Biology).

Hydrophobins

Hydrophobins are a well-defined class of proteins (Wessels, 1997, Adv. Microb. Physio. 38: 1-45; Wosten, 2001, Annu Rev. Microbiol. 55: 625-646) capable of self-assembly at a hydrophobic/hydrophilic interface, and having a conserved sequence:

(SEQ ID No. 1)

$X_n$-C-$X_{5-9}$-C-C-$X_{11-39}$-C-$X_{8-23}$-C-$X_{5-9}$-C-C-$X_{6-18}$-X-$X_m$ where X represents any amino acid, and n and m independently represent an integer. Typically, a hydrophobin has a length of up to 125 amino acids. The cysteine residues (C) in the conserved sequence are part of disulphide bridges. In the context of the present invention, the term hydrophobin has a wider meaning to include functionally equivalent proteins still displaying the characteristic of self-assembly at a hydrophobic-hydrophilic interface resulting in a protein film, such as proteins comprising the sequence:

(SEQ ID No. 2)

$X_n$-C-$X_{1-50}$-C-$X_{0-5}$-C-$X_{1-100}$-C-$X_{1-100}$-C-$X_{1-50}$-C-$X_{0-5}$-C-$X_{1-50}$-C-$X_m$ or parts thereof still displaying the characteristic of self-assembly at a hydrophobic-hydrophilic interface resulting in a protein film. In accordance with the definition of the present invention, self-assembly can be detected by adsorbing the protein to Teflon and using Circular Dichroism to establish the presence of a secondary structure (in general, α-helix) (De Vocht et al., 1998, Biophys. J. 74: 2059-68).

The formation of a film can be established by incubating a Teflon sheet in the protein solution followed by at least three washes with water or buffer (Wosten et al., 1994, Embo. J. 13: 5848-54). The protein film can be visualised by any suitable method, such as labeling with a fluorescent marker or by the use of fluorescent antibodies, as is well established in the art. m and n typically have values ranging from 0 to 2000, but more usually m and n in total are less than 100 or 200. The definition of hydrophobin in the context of the present invention includes fusion proteins of a hydrophobin and another polypeptide as well as conjugates of hydrophobin and other molecules such as polysaccharides.

Hydrophobins identified to date are generally classed as either class I or class II. Both types have been identified in fungi as secreted proteins that self-assemble at hydrophobilic interfaces into amphipathic films. Assemblages of class I hydrophobins are relatively insoluble whereas those of class II hydrophobins readily dissolve in a variety of solvents.

Hydrophobin-like proteins have also been identified in filamentous bacteria, such as *Actinomycete* and *Steptomyces* sp. (WO01/74864). These bacterial proteins, by contrast to fungal hydrophobins, form only up to one disulphide bridge since they have only two cysteine residues. Such proteins are an example of functional equivalents to hydrophobins having the consensus sequences shown in SEQ ID Nos. 1 and 2, and are within the scope of the present invention.

The hydrophobins can be obtained by extraction from native sources, such as filamentous fungi, by any suitable process. For example, hydrophobins can be obtained by culturing filamentous fungi that secrete the hydrophobin into the growth medium or by extraction from fungal mycelia with 60% ethanol. It is particularly preferred to isolate hydrophobins from host organisms that naturally secrete hydrophobins. Preferred hosts are hyphomycetes (e.g. *Trichoderma*), *basidiomycetes* and *ascomycetes*. Particularly preferred hosts are food grade organisms, such as *Cryphonectria parasitica* which secretes a hydrophobin termed cryparin (MacCabe and Van Alfen, 1999, App. Environ. Microbiol. 65: 5431-5435).

Alternatively, hydrophobins can be obtained by the use of recombinant technology. For example host cells, typically micro-organisms, may be modified to express hydrophobins and the hydrophobins can then be isolated and used in accordance with the present invention. Techniques for introducing nucleic acid constructs encoding hydrophobins into host cells are well known in the art. More than 34 genes coding for hydrophobins have been cloned, from over 16 fungal species (see for example WO96/41882 which gives the sequence of hydrophobins identified in *Agadicus bisporus*; and Wosten, 2001, Annu Rev. Microbiol. 55: 625-646). Recombinant technology can also be used to modify hydrophobin sequences or synthesise novel hydrophobins having desired/improved properties.

Typically, an appropriate host cell or organism is transformed by a nucleic acid construct that encodes the desired hydrophobin. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species, include yeasts such as (but not limited to) those of the genera *Saccharomyces, Kluyveromyces, Pichia, Hansenula, Candida, Schizo saccharomyces* and the like, and filamentous species such as (but not limited to) those of the genera *Aspergillus, Trichoderma, Mucor, Neurospora, Fusarium* and the like.

The sequences encoding the hydrophobins are preferably at least 80% identical at the amino acid level to a hydrophobin identified in nature, more preferably at least 95% or 100% identical. However, persons skilled in the art may make conservative substitutions or other amino acid changes that do not reduce the biological activity of the hydrophobin. For the purpose of the invention these hydrophobins possessing this high level of identity to a hydrophobin that naturally occurs are also embraced within the term "hydrophobins".

Hydrophobins can be purified from culture media or cellular extracts by, for example, the procedure described in WO01/57076 which involves adsorbing the hydrophobin present in a hydrophobin-containing solution to surface and then contacting the surface with a surfactant, such as Tween 20, to elute the hydrophobin from the surface. See also Collen et al., 2002, Biochim Biophys Acta. 1569: 139-50; Calonje et al., 2002, Can. J. Microbiol. 48: 1030-4; Askolin et al., 2001, Appl Microbiol Biotechnol. 57: 124-30; and De Vries et al., 1999, Eur J. Biochem. 262: 377-85.

Flowable Aerated Compositions and Products

By the terms "flowable composition" or "flowable product", which are used interchangeably herein, we mean a composition where the composition will flow following a relatively small amount of agitation (e.g. shaking, stirring or sucking), as opposed to a solid or set composition. Flowable compositions include pourable compositions and semi-set compositions. The temperature at which the flowability of the composition or product is considered is the temperature at which the product is normally served. For example, flowability of a chilled product is typically determined at 5° C. whereas flowability of an ambient product is typically determined at room temperature (20° C.). Flowability of ice-containing products is typically determined at −10° C. Measurements are generally carried out at 1 atm pressure.

The term “aerated” means that gas has been intentionally incorporated into the product, such as by mechanical means. The gas can be any gas, but is preferably, particularly in the context of food products, a food-grade gas such as air, nitrogen or carbon dioxide. The extent of aeration is typically defined in terms of “overrun”. In the context of the present invention, % overrun is defined in volume terms as:

$$\left(\left(\begin{matrix}\text{volume of the final aerated product} - \\ \text{volume of the mix}\end{matrix}\right) \Big/ \text{volume of the mix}\right) \times 100$$

The amount of overrun present in the product will vary depending on the desired product characteristics. For example, the level of overrun in confectionery such as mousses can be as high as 200 to 250%. The level of overrun in some chilled products, ambient products and hot products can be lower, but generally over 10%, e.g. the level of overrun in milkshakes is typically from 10 to 40%.

Preferably the level of overrun is at least 10%, more preferably at least 25 or 50%. Preferably the level of overrun is less than 400%, more preferably less than 300 or 200%.

Preferably, the foam is substantially homogeneous.

Preferably an aerated composition of the invention will retain at least 50% of its original air phase volume, more preferably 75%, for a period of at least 3 weeks, more preferably at least a month (typically measured after storage at chill temperatures (ca. 5° C.)).

Preferably, the average bubble diameter in the composition will not change appreciably over a period of 3 weeks (typically measured after storage at chill temperatures (ca. 5° C.)) from the average size when it was initially prepared at time t=0. Preferably, the relative average bubble diameter ($d_r$) will change less than a factor of 2.5 over a period of 3 weeks, and more preferably less than a factor of 2. The relative bubble diameter ($d_r$) at time=t is as determined in the examples through the equation:

$$d_r = \frac{d_t}{d_0}$$

Where $d_0$ is the average diameter immediately after preparation, i.e. t=0, and $d_t$ is the average bubble diameter at time=t.

A suitable method for measuring changes in bubble size and foam volume is by using a light scattering technique. The Turbiscan TLab measurement system (Formulaction, France) can conveniently be used, which analyses both the backscattered and transmitted light from the aerated sample of interest.

The foam to be analysed is contained within a cylindrical sample cell (e.g. having a diameter of 25 mm filled with 20 ml of foam). A light source of wavelength λ=880 nm is used to supply the incident light, and two optical sensors receive the light transmitted through the sample (180° from the incident light) and back scattered light (45° from the incident light) from the sample. In scanning mode, the optical sensors scan the height of the tube acquiring both transmitted and backscattered data as a function of sample height and time. Therefore, migration phenomena (such as creaming) and changes in particle size (such as bubble size) can be monitored over time. Relevant theory and examples of the use of the Turbiscan measurement system can be found in: Mengual et al., Colloids and Surfaces A, 1999, 152, 112-123; Rouimi et al., Food Hydrocolloids, 2005, 19, 467-478; Also, application notes and useful information can be obtained from the manufacturer’s website: www.turbiscan.com Experimentally, average bubble size changes are best observed by variations in the backscattered light through an area of the sample where other changes (such as foam collapse or bubble creaming) are not occurring. Here, we used central areas of the foam. The backscattering level (BS) is linked to the photon transport mean free path, λ*, through the foam by the relation:

$$BS = \frac{1}{(\lambda^*)^{\frac{1}{2}}}$$

λ* is dependent upon the gas volume fraction, ϕ, and the bubble mean diameter d through:

$$\lambda^* = \frac{2d}{3\phi(1-g)Q}$$

Q and g are both optical parameters from Mie theory, where Q is the scattering efficiency factor and g is an asymmetry factor. For a foam of known volume fraction of air, the change in the average bubble diameter can be monitored over time. This is calculated automatically through the Turbiscan software.

Exact measurement parameters that can be used are stated in the Examples.

Foam stability (volume of foam as a function of time) and extent of creaming can also be determined by a visual method by observing these phenomena in foams sampled into measuring cylinders.

Preferably, the extent of creaming is such that after storage at three weeks at 5° C., the visible serum layer lying below the aerated liquid that forms at the bottom of the product container due to the depletion of air bubbles in the region through creaming does not make up more than 25% of the total product height within the container. More preferably it does not make up more than 15 or 20% of the total product height within the container. This is preferably measured using a visual method by observing this phenomenon in foams sampled into measuring cylinders.

Aerated food products of the invention typically fall into one of three groups—ambient (i.e. products stored and/or served at room temperature without the requirement for refrigeration/freezing), chilled or partially frozen (i.e. typically containing ice). The term “food” includes beverages. Chilled aerated food products include smoothies and tea. Partially frozen aerated food products include ice-containing drinks and other ice-containing products that are flowable at −10° C. (see, for example, our co-pending application WO 06/010426).

In one embodiment, the food product is a confectionery product.

Yield Stress Agents

The required yield stress, viscosity and viscoelastic nature will not only depend upon the need to prevent creaming, it will also be dependent upon the type of aerated product of interest. In one embodiment, this is a pourable foam which will have a yield stress and a relatively low viscosity on shearing (i.e. shear thinning). For example, a viscosity of less than 1 Pa s within the shear regime 10 to 100 $s^{-1}$.

The formulation requires a yield stress agent or agents, which we define here as an ingredient or ingredients (molecular or particulate) that provide an apparent yield stress to the continuous phase, thus slowing or preventing creaming of the air bubbles. Yield stress agents can also increase the viscosity at zero shear or during flow. On mild agitation (e.g. brief shaking or mixing), however, the product will flow or pour because the continuous phase exhibits shear thinning behaviour.

Compositions of the invention will have a continuous phase apparent yield stress of at least 4 Pa, preferably at least 4.2, 4.5 or 5 Pa. In one embodiment, the continuous phase apparent yield stress is less than 1 MPa, preferably less than 100,000 Pa. Continuous phase apparent yield stress for a composition of the invention can be determined as set out in the Examples.

Compositions of the invention will also have a continuous phase viscosity, measured at a shear rate of 10 $s^{-1}$, of from 0.01 to 2000 Pa s, preferably less than 1000 Pa s, more preferably less than 500, 200 or 100 Pa s. Continuous phase viscosity for a composition of the invention can be determined as set out in the Examples.

The temperature at which the flowability, apparent yield stress and viscosity of the composition or product is considered is the temperature at which the product is normally served. For example, for a chilled product these parameters are typically determined at 5° C. whereas for an ambient product these parameters are typically determined at room temperature (20° C.) and for an ice-containing product these parameters are typically determined at −10° C. Measurements are generally carried out at 1 atm pressure.

Suitable ingredients that can be used as the yield stress agents, particularly in food systems, include gelling polysaccharides, some non-limiting examples of which are summarised below:

- Thermoreversible gelling biopolymers such as gelatine, iota- and kappa-carrageenan, and agar.
- Chemically set gelling biopolymers which derive their gel structure from an interaction between the polysaccharide and an appropriate ion such as $Ca^{2+}$. Examples include sodium alginate and pectin.
- Bacterial polysaccharides such as xanthan or gellan that can form weak gel-like behaviour which is disrupted by shear. Preferably such polysaccharides are added to give a final amount of at least 0.4 wt % in the pre-aerated mix.
- Fungal polysaccharides such as schizophyllan.
- Synergistic gels that comprise of two or more biopolymers that may be individually non-gelling, but on mixing will form a gel or a gel of a higher modulus. Examples include: sodium alginate with pectin, xanthan with locust bean gum, agar with locust bean gum, and kappa carrageenan with locust bean gum.

A number of the yield stress agents described above are used conventionally to gel products such that they are set, e.g. gelatine. In the context of the present invention, to ensure that the resulting product is flowable, they will typically be included at lower levels.

Useful reference sources describing polysaccharides and their solution behaviour are: "Food polysaccharides and their applications", ed. A. M. Stephen, Marcel Dekker Inc., 2005. "Food Gels", ed. P. Harris, Elsevier, 1990.

Gelling polysaccharides are not the only ingredients that can be used as yield stress agents in the context of this invention. Any ingredient (molecular or particle) that results in an apparent yield stress of the continuous phase can be used. Other examples of yield stress agents include:

- Lipogels. These include, but are not limited to, polyglycerol esters of saturated fatty acids, and blends of monoglycerides of fatty acids with citric acid esters of saturated fatty acids, lactic acid esters of saturated fatty acids, or diacetyl tartaric acid esters of saturated fatty acids. Typically, the amount of lipogel ingredient would be less than about 2-5 wt % in the pre-aerated mix. Examples of how to produce lipogels can be found in Heertje et al., Food Science and Technology, 1998, 31, 387-396.
- Gelling proteins (thermally or chemically), e.g. whey protein.
- Oil in water emulsions where the dispersed oil particles interact with one another such as to provide the continuous phase with a gelled nature.
- Fibres e.g. of fruit or vegetable origin, modified cellulose etc.

Non-Gelling Ingredients that Increase Continuous Phase Viscosity (Thickness)

In addition to the above mentioned yield stress agents, thickeners may also be added to increase the viscosity of the pre-aerated mix, thus allowing control of the flow properties of the aerated product on use. These do not give rise to a yield stress when used individually but will contribute to the overall thickness and flow behaviour of the product. They need, however, to be used in combination with a yield stress agent or agents. Such thickeners might be used to increase the "body" of an aerated milk shake on consumption, for example.

Non-limiting examples of thickeners are: non gelling starch, whey protein, locust bean gum, guar gum, gum arabic, or carboxy methyl cellulose. Thickening or viscosifying of the pre-aerated mix may also be achieved using a number of other molecule or particle routes. For example, addition of fruit or vegetable pulp, high molecular weight sugars such as corn syrup, or use of proteins, e.g. whey protein. Some emulsion based systems can also be made to thicken for example: whipped toppings and creams. Lipogels can also be used below the concentration required to form a yield stress.

The yield stress agent(s), and thickeners where present, are selected and added in amounts suitable to give a product, prior to aeration, having the desired apparent yield stress and viscosity, as discussed above.

Aerated food products may optionally contain other ingredients such as one or more of the following: other proteins such as dairy proteins, either as pure ingredients or as liquid ingredients, e.g. milk or cream; oil or fat, notably in the form of an emulsified phase; sugars; salts; colours and flavours; chemical emulsifiers, such as monoglycerides, tea or coffee; fruit or vegetable purees/extracts/juice; stabilisers or thickeners, such as polysaccharides; preservatives; inclusions, such as nuts, fruit, toffees.

For aerated non-food products, in addition to hydrophobin and an appropriate thickening agent, other ingredients may be included to create the specific type of product. These include, but are non limited to:

- Anionic, cationic, and non-ionic surfactants.
- Fatty acids such as stearic and palmitic acid and fatty acids of mono-/di- or tri-glycerides.
- Acids or bases, such as hydrochloric acid and sodium hydroxide
- Preservatives, e.g. benzoic acid
- Sugar alcohols, e.g. glycerol and sorbitol
- Polymers such as PEGs and carbomer The amount of hydrophobin present in the product will generally vary depending on the product formulation and volume of the air phase. Typically, the product will contain at least 0.001 wt %, hydrophobin, more preferably at least 0.005 or 0.01 wt %. Typically the product will contain less than 1 wt % hydrophobin. The hydrophobin can be from a single source or a plurality of sources e.g. the hydrophobin can a mixture of two or more different hydrophobin polypeptides.

Preferably the hydrophobin is a class II hydrophobin.

The present invention also encompasses compositions for producing an aerated product, typically a food product, of the invention, which composition comprises a hydrophobin and a yield stress agent. Such compositions include liquid premixes, for example premixes used in the production of chilled or partially frozen confectionery products, and dry mixes, for example powders, to which an aqueous liquid, such as milk or water, is added prior to or during aeration.

The compositions for producing a chilled or partially frozen product of the invention, will comprise other ingredients, in addition to the hydrophobin and yield stress agent, which are normally included in the product, e.g. in the case of food products, sugar, fat, emulsifiers, flavourings etc. The compositions may include all of the remaining ingredients required to make the product such that the composition is ready to be processed, i.e. aerated, to form an aerated product of the invention.

Dry compositions for producing an aerated product of the invention will also comprise other ingredients, in addition to the hydrophobin and yield stress agent, which are normally included in the product, e.g. in the case of food products, sugar, fat, emulsifiers, flavourings etc. The compositions may include all of the remaining non-liquid ingredients required to make the product such that all that the user need only add an aqueous liquid, such as water or milk, and the composition is ready to be processed to form an aerated product of the invention. These dry compositions, examples of which include powders and granules, can be designed for both industrial and retail use, and benefit from reduced bulk and longer shelf life.

The hydrophobin is added in a form and in an amount such that it is available to stabilise the air phase. By the term "added", we mean that the hydrophobin is deliberately introduced into the product for the purpose of taking advantage of its foam stabilising properties. Consequently, where ingredients are present or added that contain fungal contaminants, which may contain hydrophobin polypeptides, this does not constitute adding hydrophobin within the context of the present invention.

Typically, the hydrophobin is added to the product in a form such that it is capable of self-assembly at an air-liquid surface.

Typically, the hydrophobin is added to the product or compositions of the invention in an isolated form, typically at least partially purified, such as at least 10% pure, based on weight of solids. By "added in isolated form", we mean that the hydrophobin is not added as part of a naturally-occurring organism, such as a mushroom, which naturally expresses hydrophobins. Instead, the hydrophobin will typically either have been extracted from a naturally-occurring source or obtained by recombinant expression in a host organism.

In one embodiment, the hydrophobin is added to the product in monomeric, dimeric and/or oligomeric (i.e. consisting of 10 monomeric units or fewer) form. Preferably at least 50 wt % of the added hydrophobin is in at least one of these forms, more preferably at least 75, 80, 85 or 90 wt %. Once added, the hydrophobin will typically undergo assembly at the air/liquid interface and therefore the amount of monomer, dimer and oligomer would be expected to decrease.

In one embodiment, the hydrophobin is added to the aerated compositions of the invention in an isolated form, typically at least partially purified.

The combination of hydrophobin and one or more yield stress agents can be used both to stabilise the air phase in an aerated flowable composition (generally by inhibiting bubble coarsening, i.e. hydrophobins have been found not only to stabilise foam volume but also the size of the bubbles within the foam) and to inhibit creaming in the composition by imparting suitable rheological properties to the continuous phase.

In another aspect, the present invention can be applied to set or frozen aerated compositions, where creaming is a problem in the time required for the product to set or freeze. Accordingly, the present invention also provides a method for inhibiting creaming in a set or frozen aerated composition prior to setting or freezing of the composition, which method comprises adding hydrophobin and a yield stress agent to the composition prior to or during setting or freezing of the product. Preferably the time taken for the product to freeze or set is greater than 1 hour. In a preferred embodiment the product, immediately after aeration, has a continuous phase viscosity of less than 100 Pa.

The present invention will now be described further with reference to the following examples which are illustrative only and non-limiting.

EXAMPLES

Experimental Methodologies

Figure 1:
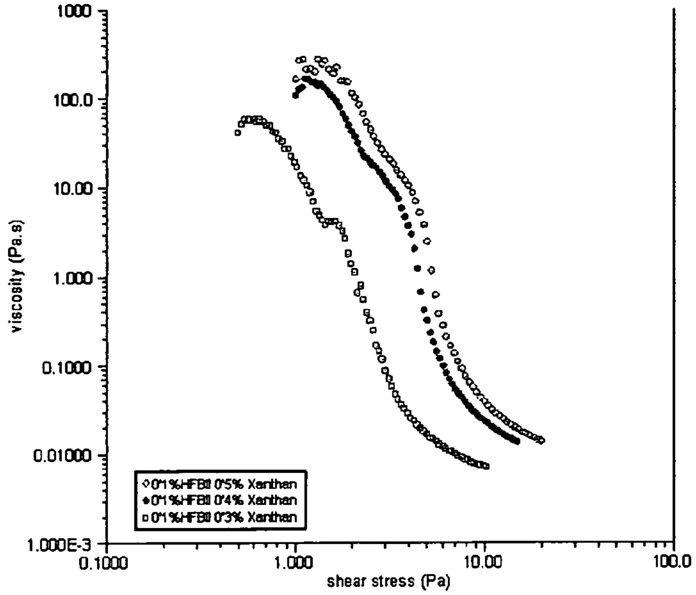
FIG. 1: Viscosity as a function of shear stress for solutions containing 0.1% class II hydrophobin (HFBII) and 0.3, 0.4, and 0.5% xanthan.

Here we describe the basis of the experimental methods used to measure the foam properties and the solution rheology of products that are encompassed within this invention. The exact experimental parameters chosen for measurement are described in the Example.

Measurements of Foam Stability, Bubble Size, and Creaming

Our principal method of measuring changes in bubble size and extent of creaming in foamed samples were by using a light scattering technique. We used the Turbiscan TLab measurement system (Formulaction, France), which analyses both the backscattered and transmitted light from the aerated sample of interest. This is described in more detail above.

We also observed foam stability (volume of foam as a function of time) and extent of creaming by a visual method by observing these phenomena in foams sampled into measuring cylinders.

Measurement of Continuous Phase Viscosity and Apparent Yield Stress

A measure of the continuous phase viscosity and the apparent yield stress of the unaerated mixes was determined by use of rheology. Exact experimental details are summarised in the Examples. To determine a measure of the apparent yield stress and a zero shear viscosity of the mixes from the log shear stress versus log viscosity data, the shear thinning regime of the curves were fitted to a Hershel-Bulkley model. We consider the apparent yield viscosity to be the minimum shear stress that causes the onset of shear thinning. This is a common method used by those skilled in the art. Useful references that describe this behaviour can be found in Stokes and Telford (Journal of Non-Newtonian Fluid Mechanics, 2004, 124, 137-146) and Barnes, Hutton, and Walters (An Introduction to Rheology, Rheology Series 3, Elsevier Science, 1989).

Example 1

Flowable Stable Foams with Reduced Creaming

Materials and Formulations

Examples of aerated chill products were prepared using 3 types of surface active protein (A to C) and a lipogel forming emulsifier (D):

A: Sodium Caseinate (Na Cas)
B: Skimmed Milk Powder (SMP)
C: Hydrophobin (HFBII) from *Trichoderma reesei*
D: Polyglycerol ester of saturated fatty acids (PGE)

Details of the materials used are summarised in Table 1 and the formulations from which each of the chill foam samples was prepared are shown in Table 2. Foams were prepared and stored at chill temperatures (5° C.). Their foam stability, with respect to bubbles size and creaming were monitored over time using the Turbiscan instrument.

TABLE 1

Ingredients used with supplier information

| Ingredient | Composition | Supplier |
|---|---|---|
| Sodium caseinate | 88-90% protein, 1.5% fat, 6% moisture | DMV International, The Netherlands. |
| Skimmed milk powder | 33-36% protein, 0.8% fat, 3.7% moisture | United Milk, UK. |
| Polyglycerol ester (PGE 55) | 100% fat | Danisco |
| HFB II | Purified from *T. reesei** | VTT Biotechnology, Finland. |
| Xanthan Gum (Keltrol RD) | polysaccharide | CP Kelco |

*Class II hydrophobin purified from *Trichoderma reesei* essentially as described in WO00/58342 and Linder et al., 2001, Biomacromolecules 2: 511-517).

TABLE 2

Formulations

| Ingredient | Mix A | Mix B | Mix C | Mix D | Mix E | Mix F | Mix G |
|---|---|---|---|---|---|---|---|
| | Concentration/wt % | | | | | | |
| Sodium caseinate | 3.4 | 0.5 | — | — | — | — | — |
| Skimmed milk powder | — | — | 10.4 | — | — | — | — |
| PGE 55 | — | — | — | — | — | — | 0.5 |
| HFB II | — | — | — | 0.1 | 0.1 | 0.1 | — |
| Xanthan gum | 0.5 | 0.5 | 0.5 | 0.5 | 0.4 | 0.3 | 0.5 |
| Water | 96.9 | 99.0 | 89.1 | 99.4 | 99.5 | 99.6 | 99.0 |

Preparation and Analysis of the Aerated Products

Mix Preparation

All mixes were made in 100 g batches. For Mixes A, B and C (containing sodium caseinate and skimmed milk powder, respectively), the protein and xanthan gum were blended and added slowly into stirred water at room temperature. The solutions were subsequently heated (to 55° C. for Na Cas and to 40° C. for SMP) to ensure that proteins were properly hydrated. The mixes were cooled and stored at 5° C. until further use.

Mix G was prepared by blending the xanthan gum powder and PGE powder together, dispersing in cold de-ionised water and then heating to 60° C. with stirring for 30 minutes. This solution was then cooled and stored at 5° C. until further use.

For Mixes D, E, and F (containing HFB II), the xanthan was first dispersed into cold water with stirring for at least 30 minutes. Then, the required concentration of HFB II was added to this as an aliquot. The solution was then gently sonicated in a sonic bath for 30 seconds to fully dissolve the HFB II. The mix was cooled and stored at 5° C. until further use.

The high levels of Na Caseinate and SMP were chosen as the protein concentrations are proportionate with the levels found in commercially sold milk shake drinks.

Aerating Process 80 mL of mix was sheared in a stirred pot apparatus (cooled to 5° C.) at a rate of 1200 rpm for a timed duration that corresponded to obtaining 100% overrun. Aeration times to reach 100% overrun are summarised in Table 3. The stirred pot equipment consists of a cylindrical, vertically mounted, jacketed stainless steel vessel with internal proportions of 105 mm height and diameter 72 mm.

The rotor used to shear the sample consists of a rectangular impeller of the correct proportions to scrape the inner surface of the vessel as it rotates (dimensions 72 mm×41.5 mm). Also attached to the rotor are two semi-circular (60 mm diameter) high-shear blades positioned at a 45° angle to the rectangular attachment. Post aeration, samples were stored at 5° C. in 100 mL measuring cylinders or standard Turbiscan vials before further analysis.

TABLE 3

Aeration time and overrun for mixes A-G

| Sample | Aeration time/mins | Overrun/% |
|---|---|---|
| Mix A | 1 | 100 |
| Mix B | 1.16 | 100 |
| Mix C | 1 | 100 |
| Mix D | 2 | 100 |
| Mix E | 2 | 100 |
| Mix F | 2 | 100 |
| Mix G | 10 | 100 |

Viscosity and Apparent Yield Stress Measurements

Rheological measurements were made using an AR-G2 rheometer (TA Instruments Ltd, Crawley, UK). Stepped flow experiments were performed on unaerated mixes to determine viscosity versus shear stress and viscosity versus shear rate curves. All measurements were carried out at 5° C. (using peltier-controlled cooling). A cone and plate geometry was used. The cone was made of stainless steel and was 6 mm in diameter with a 2° angle. From these data, plots of viscosity as a function of shear stress and viscosity as a function of shear rate could be determined. Using the Hershel Bulkley model (which fits to data at the high shear stress end of the data), an apparent yield stress can be determined.

Measurement of Foam and Bubble Stability and Extent of Foam Creaming

The stability of the foam and the bubbles therein was measured using the Turbiscan TLab, the operating details of which were discussed previously. This enables the determination of the following as a function of time: (1) The foam volume (i.e. measurement of overall air phase loss). (2) The average bubble size. (3) The extent of creaming in the foam.

The produced foam was dosed into a Turbiscan glass sample tube up to a height of about 42 mm, corresponding to approximately 20 mL of foam. The equipment then scans and measures both the backscattered and transmitted light between the height of 2 and 55 mm. Measurements were taken over a period of several weeks. Since data is collected over the full sample height, from this, the mean values of the backscattering profiles between defined limits (lower and upper height) give specific information with respect to changes in the sample in that area, e.g. bubble size or creaming.

Bubble size: From the backscattered data measured between 20 and 30 mm, the average bubble size was calculated automatically from the backscattered light. The refractive indices were taken as those of water and air. The air phase volume fraction of the foam was 0.5. Although the air phase volume fraction of the foam can change over time, particularly if it is not stable and creaming takes place, we found that taking measurements between 20 and 30 mm height of the sample gave reliable size data unless the foam was very unstable. If the foam was highly unstable, then the size data needs to be treated with caution in a quantitative sense but can be compared with that of other foams.

Foam creaming: The extent of creaming in the foam was measured by two methods.

1. Light scattering using the Turbiscan: The amount of foam creaming over time was determined by measuring the change in backscattered light over time between the sample height of 0 to 10 mm. As the foam creams, the backscattering intensity between these heights will be expected to decrease, since more light will be backscattered in the presence of air bubbles. These data were obtained principally for the HFBII foams because the stability of the bubbles means that the changes in backscattering can be attributed solely to changes in the volume of air bubbles within a region of the sample cell. For less stable foams that exhibit both rapid bubble growth and creaming, it is more difficult to quantitatively de-convolute the two since both processes occur at the same time.

2. Visual observations in a measuring cylinder. 100 mL of produced foam were placed in a 100 mL measuring cylinder and the top covered with cling film to prevent drying of the top of the foam. The height of the foam and the height of serum (continuous phase) as the foam creams over time were recorded. Even when bubble growth and serum separation (creaming) occur at the same time, the extent of creaming can be quantitatively stated.

Results and Discussion

Viscosity and Yield Stress of Mixes

The viscosity and the yield stress of the mix is important in preventing or controlling the rate of bubble creaming. Therefore, in formulating aerated products where creaming is arrested, it is appropriate to make some analysis of the rheology to aid in predictive capability. Here we describe some of the main rheological features of Mixes D, E, and F, containing 0.1 wt % HFBII and 0.5, 0.4, and 0.3 wt % xanthan in the solution, respectively.

Figure 2:
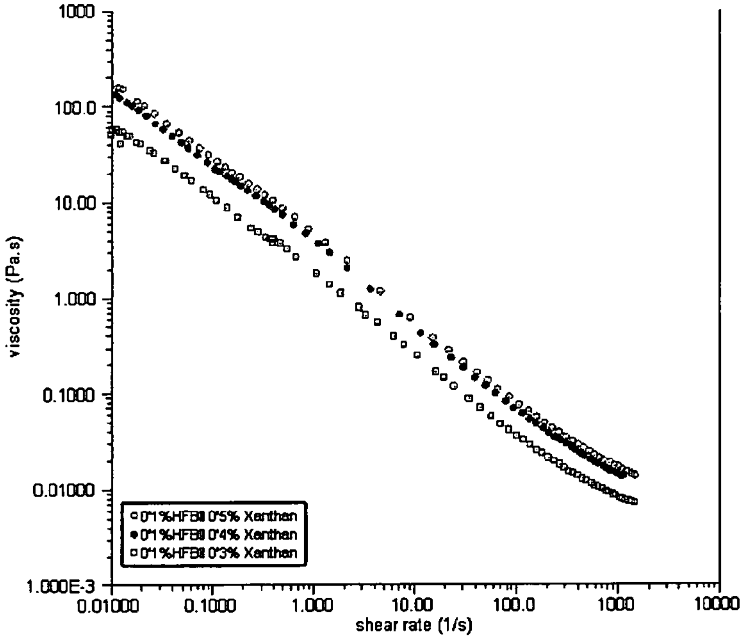
FIG. 2: Viscosity as a function of shear rate for solutions containing 0.1% HFBII and 0.3, 0.4, and 0.5% xanthan.

FIGS. 1 and 2 both show important rheological conditions for the enabling of pourable foams. The data in FIG. 1 show the effect of xanthan concentration on the apparent yield stress and on the viscosity of the solution. Using the Hershel Bulkley model (which fits to data at the high shear stress end of the data), an apparent yield stress can be determined. From the data, we calculate for:

0.3 wt % xanthan solution with 0.1% hydrophobin–apparent yield stress=2.8 Pa 0.4 wt % xanthan solution with 0.1% hydrophobin–apparent yield stress=4.5 Pa 0.5 wt % xanthan solution with 0.1% hydrophobin–apparent yield stress=5.5 Pa The apparent yield stress is the main parameter that will govern the rate and extent of creaming. The data in FIG. 2 shows the effect of xanthan concentration on the viscosity of the mixes at high shear. We suggest that the viscosity of the mix at shear rates between 10 and 100 $s^{-1}$ is comparable to the viscosity that would be experienced in flow or consumption. For each of the xanthan concentrations, the mix viscosity over the shear rate regime 10 to 100 $s^{-1}$ is less than 1 Pa s.

Bubble Stability

Figure 3:
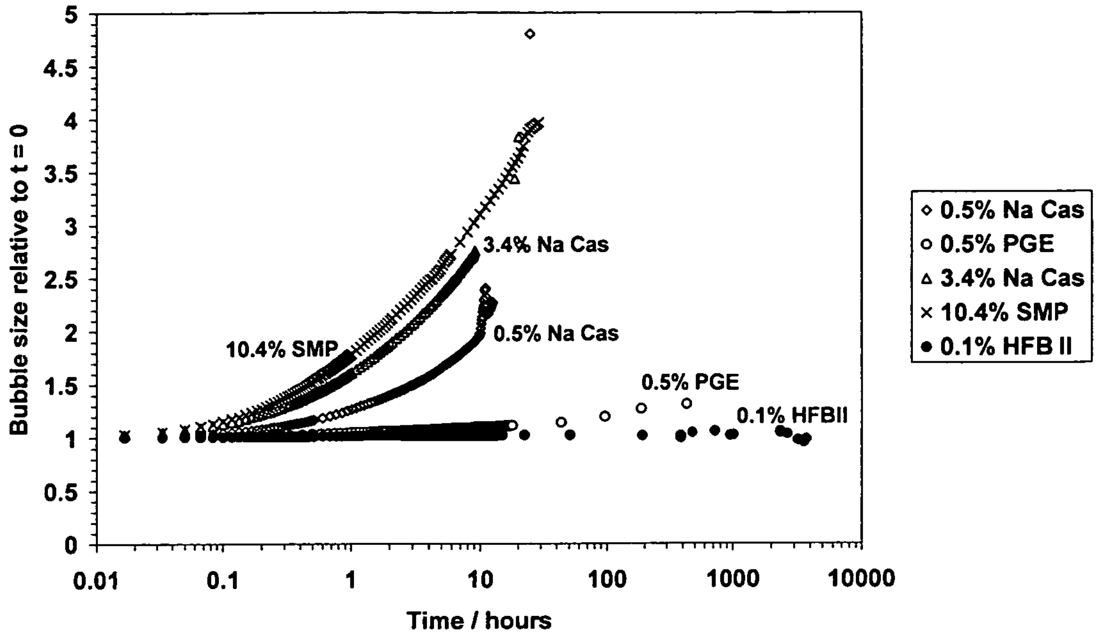
FIG. 3. Average bubble diameter relative to that at time t=0 as function of time for sodium caseinate (Na Cas), skimmed milk powder (SMP), polyglycerol ester (PGE) and HFB II stabilised foams FIG. 4. Foam stability to creaming for foams stabilised by a surface active agent with 0.5% xanthan in the aqueous phase.

The change in relative average bubble size ($d_r$) of in the foams as a function of time are shown in FIG. 3. In the case of HFBII, the bubbles are very stable and no change in average size is seen after several weeks storage at chill. 0.5% PGE also shows good stability, although the average bubble size does gradually increase. Further, the level of PGE used (0.5 wt %) is higher than that normally permitted in foodstuffs. Each of the non-HFB proteins show poor stability. Rapid bubble growth occurs over just a few hours for each of the aerated mixes. Coarsening of these foams accelerates over the short life time, ultimately leading to complete foam break down.

Creaming of the Foam

Figure 4:
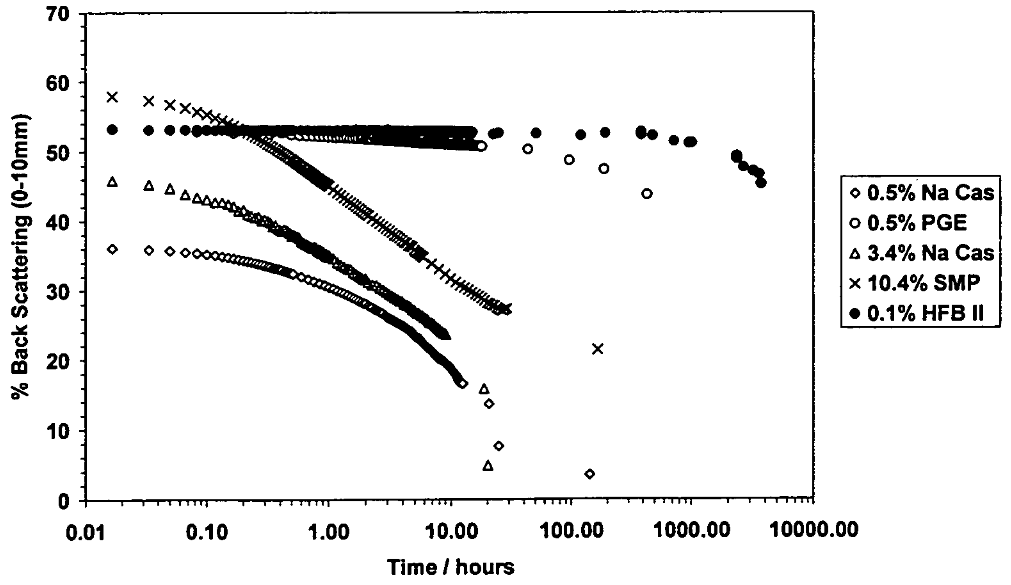

FIG. 4 shows the changes in back scattering as a function of time over the height range 0 to 10 mm in the sample vial. In the case of PGE and HFBII, where the bubble sizes were shown to stay near constant over long periods of time (particularly with HFBII), it is apparent that the backscattering also does not change significantly. Only a small amount of creaming is observed over long time scales (over 1000 hours, which equates to in excess of one month).

In the case of the foams stabilised by the dairy proteins (SMP and Na Cas), interpreting the light scattering data is somewhat more complex since both creaming and bubble growth will occur concurrently. However, some general remarks can be made. Using a concentration of 0.5% xanthan, at time=0 the bubbles are of comparable initial size to those made with HFBII. Therefore, we expect creaming to be inhibited at this point. However, bubble growth does occur (due to disproportionation and coalescence) leading to a decrease in the measured backscattering. Ultimately, the bubbles will exceed a critical average diameter and then they will start to cream as the buoyancy force exceeds the yield stress holding the bubbles in place. Although the presence of xanthan gum provides a yield stress to the system which is expected to prevent creaming of small bubbles (ca.<200 μm diameter), eventually the bubbles grow beyond this and the yield stress is not enough to prevent the rise of the bubbles. This process, and further bubble growth, leads to an accelerating rate of decrease in the backscattering over time.

Foam stabilised by HFB II clearly shows superior stability to any of the other surfactants investigated here.

Effect of Xanthan Concentration (i.e. Effect of Apparent Yield Stress)

Figure 5:
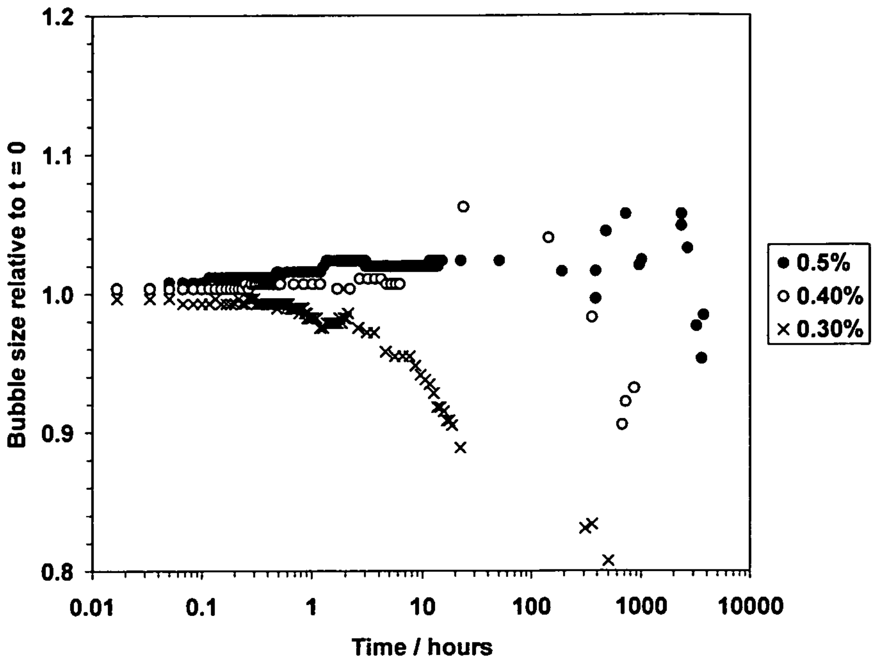
FIG. 5: Average bubble diameter relative to that at time t=0 as function of time for foams made using HFBII with different concentrations of xanthan gum.
Figure 6:
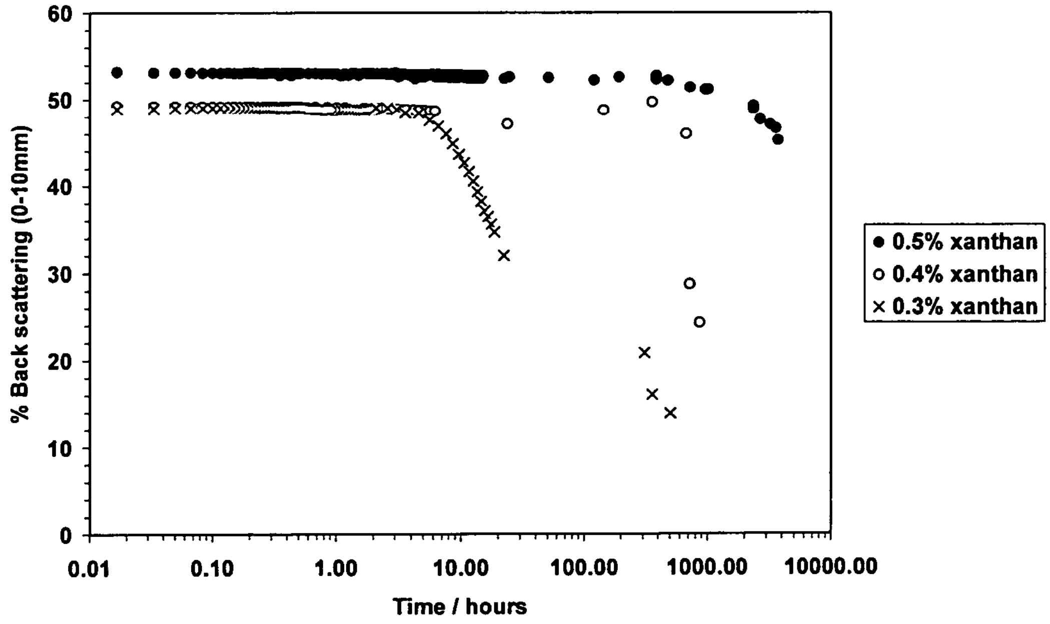
FIG. 6. Stability, to creaming for HFB II foams with xanthan in the continuous phase.

The data presented in FIGS. 5 and 6 demonstrate the effect of xanthan concentration, and hence yield stress, on the extent of creaming in a foam consisting of stable bubbles produced using 0.1% HFBII.

In FIG. 5, it is clear that at 0.5% xanthan concentration, over a period of 1000+ hours, the bubble size in the sample area measured changes very little. Decreasing the concentration of xanthan to 0.4% leads to a small decrease in measured bubble size over long time periods. This is probably not due to bubble shrinkage, but rather due to creaming of bubbles. The larger bubbles rise out of the measurement zone, leaving a larger proportion of bubbles in the measurement zone. This leads to an apparent decrease in average bubble size. The same effect is seen at 0.3% xanthan over a shorter time period. The effect is quicker due to the lower yield stress. It should be highlighted, however, that the changes observed at 0.4 and 0.5% xanthan concentrations are relatively small.

The conclusions drawn from FIG. 5 are further demonstrated in FIG. 6. This shows the extent of creaming through the measured backscattering at the bottom of the sample vial (0 to 10 mm). Clearly, at 0.5% xanthan, creaming is inhibited with only a small amount of visible serum layer apparent after over a month's storage. Creaming takes place more quickly and to a greater extent as the amount of xanthan is reduced and the yield stress is reduced. These changes occur at the same time as the bubble size changes seen in FIG. 5.

Figure 7:
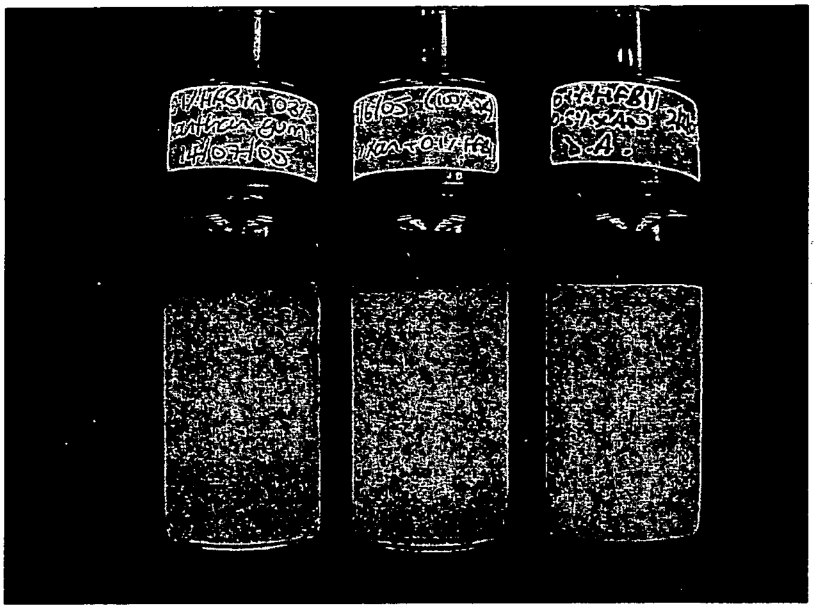
FIG. 7: Images of foams containing 0.1% HFB II with (left) 0.3% xanthan after months storage (centre) 0.4% xanthan after 6 weeks storage (right) 0.5% xanthan after 5 months storage at 5° C.
Figure 8:
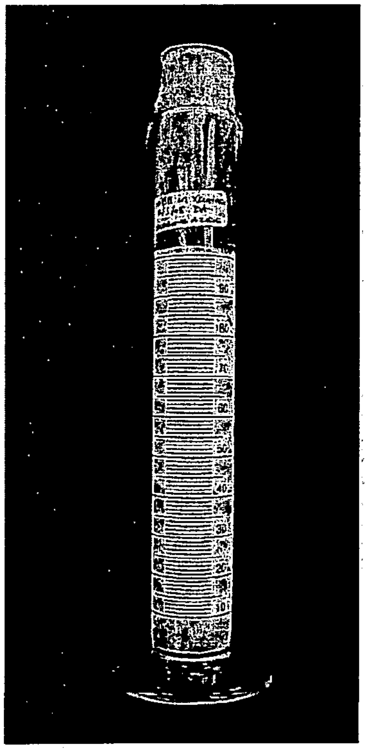
FIG. 8: Images of foam containing 0.1% HFBII and 0.5% xanthan after 5 months storage at 5° C. Foam placed in 100 mL measuring cylinder (left) and close up (right) showing very small degree (<5% by volume) phase separation (creaming).
Figure 8:
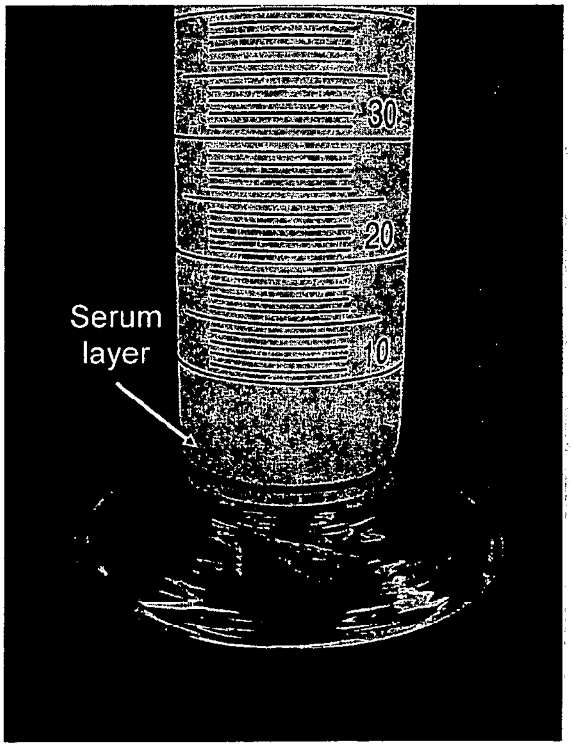

The visual appearance of the aerated foams containing HFBII and xanthan after storage at 5° C. are shown in FIGS. 7 and 8. It is clear that after extended storage time, using 0.5% xanthan as the thickening agent, bubble creaming is almost entirely inhibited and only slight phase separation can be seen. Using 0.4% xanthan, there is a greater (although still only small) amount of creaming. Using 0.3% xanthan, the apparent yield stress is not great enough to prevent creaming over the storage time. This particular product would not be acceptable (the level of serum separation noted at the bottom of the vial exceeds 10% after 3 weeks), whereas using 0.4 and 0.5% xanthan would be acceptable (level of serum was less than 10% after 3 weeks).

Accordingly, since the apparent yield stress of the continuous phase calculated above for 0.3, 0.4 and 0.5% xanthan is 2.8, 4.5 and 5.5 Pa, respectively, we have determined that the minimum apparent yield stress should be at least about 4 Pa.

Example 2

Aerated Chocolate Milkshake

Figure 9:
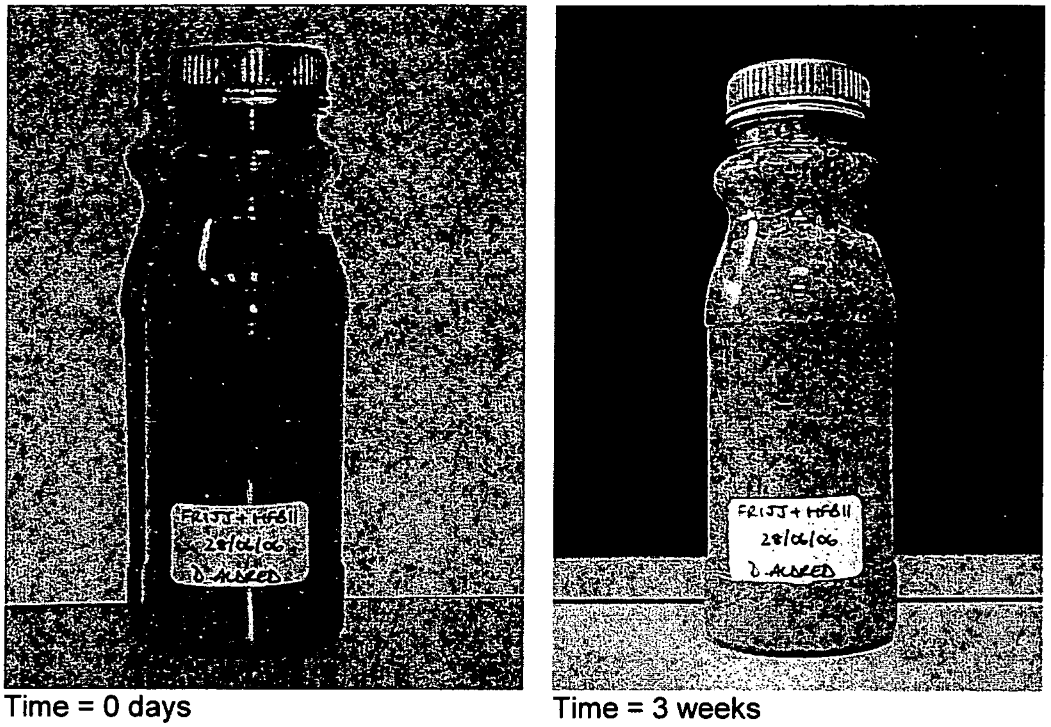
FIG. 9: Images of an aerated milk shake product containing 0.1% HFBII and 0.41% xanthan freshly made (left) and after 3 weeks storage at 5° C. (right) showing little creaming or bubble growth.

An aerated chocolate-flavoured milk shake was prepared as follows. A commercially available milkshake (Frijj™ Thick Fresh Milkshake produced by Dairy Crest Ltd, Shropshire, UK) was purchased. This is an unaerated product and, according to the ingredient list, contained: skimmed milk, whole milk, sugar, modified maize starch, fat reduced cocoa powder, buttermilk powder and stabilisers (carrageenan and guar gum). Xanthan gum was slowly added to the milk shake with stirring to a concentration of 0.5 wt %. This was then mixed for 20 minutes to allow the xanthan gum to hydrate fully. A known volume of 0.5 wt. % hydrophobin solution was aerated to 400% overrun using a hand held Aerolatte™ device. This was added to the milk shake to give an aerated milkshake product with 100% overrun, an overall hydrophobin concentration of 0.1 wt % and an overall xanthan concentration of about 0.41 wt %. The aerated milkshake product was then stored at 5° C. and its stability monitored over a period of three weeks. FIG. 9 shows that after 3 weeks, the aerated milkshake product retained a stable air phase which did not cream or collapse and showed no significant bubble growth.

Example 3

Aerated Fruit Smoothie

Figure 10:
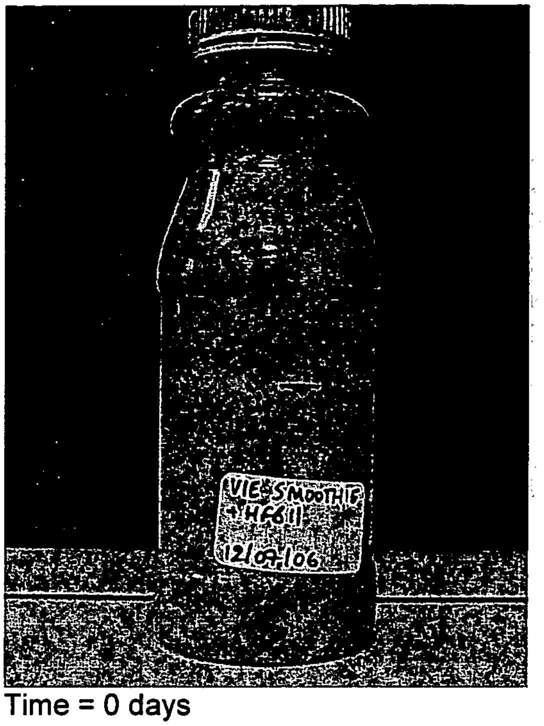
FIG. 10: Images of an aerated fruit smoothie product containing 0.1% HFBII and 0.41% xanthan freshly made (left) and after 3 weeks storage at 5° C. (right) showing little creaming or bubble growth.
Figure 10:
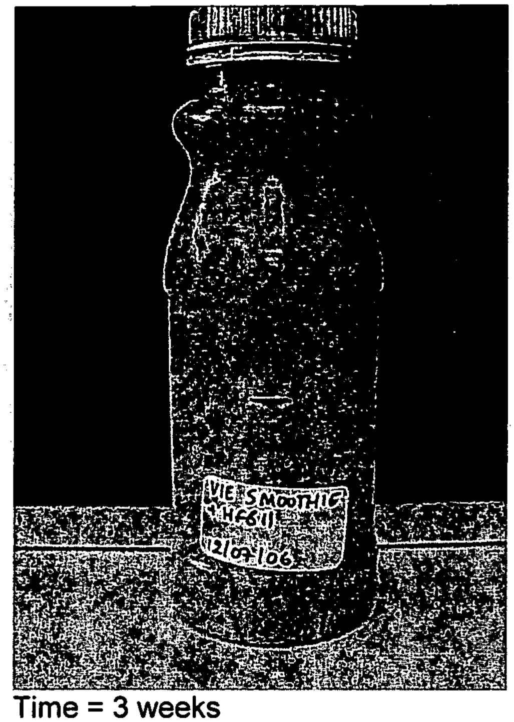

An aerated fruit smoothie was prepared using a Vie Shots™ drink, produced by Unilever UK as a fruit puree base. The Vie Shot™ contained: banana puree (28%), orange juice concentrate (26%), carrot juice concentrate (23%), pumpkin juice concentrate (14%), orange pulp (4%), lemon juice concentrate, acerola cherry concentrate (1.5%), and apple pectin. The pH was measured (at room temperature) to be 4.17. Xanthan gum was slowly added to the fruit puree with stirring to a concentration of 0.5 wt %. This was then mixed for 20 minutes to allow the xanthan gum to hydrate fully. A known volume of 0.5 wt. % hydrophobin solution was aerated to 400% overrun using a hand held Aerolatte™ device. This was added to the fruit puree to give an aerated fruit smoothie product with approximately 100% overrun, an overall hydrophobin concentration of 0.1 wt % and an overall xanthan concentration of about 0.41 wt %. The aerated fruit smoothie product was then stored at 5° C. and its stability monitored over a period of three weeks. FIG. 10 shows that after 3 weeks the aerated fruit smoothie product retained a stable air phase and that no significant bubble growth or creaming occurred.

The various features and embodiments of the present invention, referred to in individual sections above apply, as appropriate, to other sections, *mutatis mutandis*. Consequently features specified in one section may be combined with features specified in other sections, as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A flowable aerated food composition comprising a class II hydrophobin in an amount of at least 0.001 wt % up to less than 1 wt %, and a yield stress agent, the composition having a continuous phase viscosity, measured at a shear rate of 10 $s^{-1}$, of from 0.01 to 2000 Pa·s, and a continuous phase apparent yield stress of at least 4 Pa, said composition having an overrun of at least 10% to less than 400%, said hydrophobin being added in an isolated form, wherein the relative average bubble diameter, $d_r$, will change less than a factor of 2.0 over a period of 3 weeks after storage at ca.5° C.

2. An aerated composition according to claim 1 wherein the yield stress agent is a polysaccharide.

3. An aerated composition according to claim 2 wherein the polysaccharide is xanthan and/or gellan.

4. An aerated composition according to claim 1 which comprises a thickener.

5. An aerated composition according to claim 1 which is pourable.

6. An aerated food product according to claim 1 which is a chilled food product.

7. The aerated composition of claim 1 which retains at least 50% of its original air phase volume for a period of at least 3 weeks, measured after storage at ca 5° C.

8. The flowable aerated composition according to claim 1 wherein the composition is a milk shake.

9. The flowable aerated composition according to claim 1 wherein the yield stress agent is selected from the group of xanthan, gelatin, kappa carrageenan, gellan, modified cellulose, locust bean gum and alginate.

10. The milk shake according to claim 8 having an overrun of 10-40%.

11. The aerated composition according to claim 1 wherein the hydrophobin comprises HFBII.

12. The aerated composition according to claim 11 wherein the average bubble diameter, dr in the composition will not change more than a factor of about 1.1 over a period of 3 weeks measured after storage of at chill temperatures of ca. 5° C.

13. The flowable aerated composition according to claim 1 wherein after storage of 100 ml of foam in a 100 ml measuring cylinder at three weeks at 5° C. the level of serum separation noted at the bottom of the container is less than 15%.

14. The flowable aerated food product according to claim 1 having a continuous phase viscosity measured at 10 $s^{-1}$ of less than 1 Pa·s.

15. The aerated composition according to claim 1 wherein the hydrophobin is obtained by use of recombinant technology, and the hydrophobin comprises HFBII.

16. The flowable aerated food composition according to claim 1 wherein the hydrophobin is in a form which is at least partially purified such that it is at least 10% pure based on weight of solids.

17. The composition according to claim 1 further comprising a dairy protein.

18. The composition according to claim 1 further comprising a gelling protein.

19. A flowable aerated food composition comprising a class II hydrophobin in an amount of at least 0.001 wt % up to less than 1 wt %, and a yield stress agent, the composition having a continuous phase viscosity, measured at a shear rate of 10 $s^{-1}$, of from 0.01 to 2000 Pa·s, and a continuous phase apparent yield stress of at least 4 Pa, said composition having an overrun of at least 10% to less than 400%, wherein the hydrophobin is obtained by use of recombinant technology, wherein the relative average bubble diameter, $d_r$, will change less than a factor of 2.0 over a period of 3 weeks after storage at ca. 5° C.

20. The composition according to claim 19 further comprising a dairy protein.

21. The composition according to claim 19 further comprising a gelling protein.

22. The aerated composition according to claim 19 wherein the hydrophobin comprises HFBII.

23. The aerated composition according to claim 19 wherein the average bubble diameter, dr in the composition will not change more than a factor of about 1.1 over a period of 3 weeks measured after storage of chill temperatures of ca. 5° C.

24. The flowable aerated food product according to claim 19 having a continuous phase viscosity measured at 10 s-1 of less than 1 Pa·s.

25. The food composition according to claim 1 wherein the hydrophobin is added to the product in a form such that it is capable of self-assembly at an air-liquid surface.

26. The food composition according to claim 19 wherein the hydrophobin is obtained by modifying host cells to express hydrophobins.

27. The food composition according to claim 1 wherein the yield stress agent comprises a gelling polysaccharide.

28. The food composition according to claim 27 wherein the gelling polysaccharide comprises thermoreversible gelling biopolymer.

29. The food composition according to claim 27 wherein the gelling polysaccharide comprises chemically set gelling biopolymer.

30. The food composition according to claim 27 wherein the gelling biopolymer comprises bacterial polysaccharide which forms weak gel like behavior which is disrupted by shear.

31. The food composition according to claim 27 wherein the gelling polysaccharide is a fungal polysaccharide.

32. The food composition according to claim 27 wherein the gelling polysaccharide comprises a synergistic gel which includes two or more biopolymers which on mixing form a gel.

33. The food composition according to claim 32 wherein the synergistic gel comprises sodium alginate with pectin, xanthan with locust bean gum, agar with locust bean gum, or carrageenan with locust bean gum.

* * * * *

SEQUENCE LISTING

```
<160> NUMBER OF SEQ ID NOS: 2

<210> SEQ ID NO 1
<211> LENGTH: 4106
<212> TYPE: PRT
<213> ORGANISM: Artificial
<220> FEATURE:
<223> OTHER INFORMATION: Exemplary sequence used to illustrate
      invention.
<220> FEATURE:
<221> NAME/KEY: REPEAT
<222> LOCATION: (1)..(2000)
<223> OTHER INFORMATION: Xaa is any amino acid and can be shown 1 to
      2000 times.
<220> FEATURE:
<221> NAME/KEY: REPEAT
<222> LOCATION: (2002)..(2010)
<223> OTHER INFORMATION: Xaa is any amino acid and can be shown 5 to 9
      times.
<220> FEATURE:
<221> NAME/KEY: REPEAT
<222> LOCATION: (2013)..(2051)
<223> OTHER INFORMATION: Xaa is any amino acid and can be shown 11 to 39
      times.
<220> FEATURE:
<221> NAME/KEY: REPEAT
<222> LOCATION: (2053)..(2075)
<223> OTHER INFORMATION: Xaa is any amino acid and can be shown 8 to 23
      times.
<220> FEATURE:
<221> NAME/KEY: REPEAT
<222> LOCATION: (2077)..(2085)
<223> OTHER INFORMATION: Xaa is any amino acid and can be shown 5 to 9
      times.
<220> FEATURE:
<221> NAME/KEY: REPEAT
<222> LOCATION: (2088)..(2105)
<223> OTHER INFORMATION: Xaa is any amino acid and can be shown 6 to 18
      times.
<220> FEATURE:
<221> NAME/KEY: REPEAT
<222> LOCATION: (2107)..(4106)
<223> OTHER INFORMATION: indefinite repeats.  Xaa is any amino acid.

<400> SEQUENCE: 1

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa Xaa
    50                  55                  60

Xaa Xaa Xaa Xaa Xaa Xaa Xaa Xaa Xaa Xaa Xaa Xaa Xaa Xaa Xaa Xaa
65                  70                  75                  80

Xaa Xaa Xaa Xaa Xaa Xaa Xaa Xaa Xaa Xaa Xaa Xaa Xaa Xaa Xaa Xaa
                85                  90                  95

Xaa Xaa Xaa Xaa Xaa Xaa Xaa Xaa Xaa Xaa Xaa Xaa Xaa Xaa Xaa Xaa
            100                 105                 110

Xaa Xaa Xaa Xaa Xaa Xaa Xaa Xaa Xaa Xaa Xaa Xaa Xaa Xaa Xaa Xaa
        115                 120                 125

Xaa Xaa Xaa Xaa Xaa Xaa Xaa Xaa Xaa Xaa Xaa Xaa Xaa Xaa Xaa Xaa
    130                 135                 140

Xaa Xaa Xaa Xaa Xaa Xaa Xaa Xaa Xaa Xaa Xaa Xaa Xaa Xaa Xaa Xaa
145                 150                 155                 160

Xaa Xaa Xaa Xaa Xaa Xaa Xaa Xaa Xaa Xaa Xaa Xaa Xaa Xaa Xaa Xaa
                165                 170                 175
```

-continued

```
Xaa Xaa Xaa Xaa Xaa Xaa Xaa Xaa Xaa Xaa Xaa Xaa Xaa Xaa Xaa Xaa
            180                 185                 190

Xaa Xaa Xaa Xaa Xaa Xaa Xaa Xaa Xaa Xaa Xaa Xaa Xaa Xaa Xaa Xaa
        195                 200                 205

Xaa Xaa Xaa Xaa Xaa Xaa Xaa Xaa Xaa Xaa Xaa Xaa Xaa Xaa Xaa Xaa
    210                 215                 220

Xaa Xaa Xaa Xaa Xaa Xaa Xaa Xaa Xaa Xaa Xaa Xaa Xaa Xaa Xaa Xaa
225                 230                 235                 240

Xaa Xaa Xaa Xaa Xaa Xaa Xaa Xaa Xaa Xaa Xaa Xaa Xaa Xaa Xaa Xaa
                245                 250                 255

Xaa Xaa Xaa Xaa Xaa Xaa Xaa Xaa Xaa Xaa Xaa Xaa Xaa Xaa Xaa Xaa
            260                 265                 270

Xaa Xaa Xaa Xaa Xaa Xaa Xaa Xaa Xaa Xaa Xaa Xaa Xaa Xaa Xaa Xaa
        275                 280                 285

Xaa Xaa Xaa Xaa Xaa Xaa Xaa Xaa Xaa Xaa Xaa Xaa Xaa Xaa Xaa Xaa
    290                 295                 300

Xaa Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa Xaa
                325                 330                 335

Xaa Xaa Xaa Xaa Xaa Xaa Xaa Xaa Xaa Xaa Xaa Xaa Xaa Xaa Xaa Xaa
            340                 345                 350

Xaa Xaa Xaa Xaa Xaa Xaa Xaa Xaa Xaa Xaa Xaa Xaa Xaa Xaa Xaa Xaa
        355                 360                 365

Xaa Xaa Xaa Xaa Xaa Xaa Xaa Xaa Xaa Xaa Xaa Xaa Xaa Xaa Xaa Xaa
    370                 375                 380

Xaa Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa Xaa Xaa Xaa Xaa Xaa Xaa Xaa
                405                 410                 415

Xaa Xaa Xaa Xaa Xaa Xaa Xaa Xaa Xaa Xaa Xaa Xaa Xaa Xaa Xaa Xaa
            420                 425                 430

Xaa Xaa Xaa Xaa Xaa Xaa Xaa Xaa Xaa Xaa Xaa Xaa Xaa Xaa Xaa Xaa
        435                 440                 445

Xaa Xaa Xaa Xaa Xaa Xaa Xaa Xaa Xaa Xaa Xaa Xaa Xaa Xaa Xaa Xaa
    450                 455                 460

Xaa Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa Xaa
                485                 490                 495

Xaa Xaa Xaa Xaa Xaa Xaa Xaa Xaa Xaa Xaa Xaa Xaa Xaa Xaa Xaa Xaa
            500                 505                 510

Xaa Xaa Xaa Xaa Xaa Xaa Xaa Xaa Xaa Xaa Xaa Xaa Xaa Xaa Xaa Xaa
        515                 520                 525

Xaa Xaa Xaa Xaa Xaa Xaa Xaa Xaa Xaa Xaa Xaa Xaa Xaa Xaa Xaa Xaa
    530                 535                 540

Xaa Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa Xaa
                565                 570                 575

Xaa Xaa Xaa Xaa Xaa Xaa Xaa Xaa Xaa Xaa Xaa Xaa Xaa Xaa Xaa Xaa
            580                 585                 590
```

-continued

```
Xaa Xaa Xaa Xaa Xaa Xaa Xaa Xaa Xaa Xaa Xaa Xaa Xaa Xaa Xaa Xaa
        595                 600                 605

Xaa Xaa Xaa Xaa Xaa Xaa Xaa Xaa Xaa Xaa Xaa Xaa Xaa Xaa Xaa Xaa
    610                 615                 620

Xaa Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa Xaa
                645                 650                 655

Xaa Xaa Xaa Xaa Xaa Xaa Xaa Xaa Xaa Xaa Xaa Xaa Xaa Xaa Xaa Xaa
            660                 665                 670

Xaa Xaa Xaa Xaa Xaa Xaa Xaa Xaa Xaa Xaa Xaa Xaa Xaa Xaa Xaa Xaa
        675                 680                 685

Xaa Xaa Xaa Xaa Xaa Xaa Xaa Xaa Xaa Xaa Xaa Xaa Xaa Xaa Xaa Xaa
    690                 695                 700

Xaa Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa Xaa
                725                 730                 735

Xaa Xaa Xaa Xaa Xaa Xaa Xaa Xaa Xaa Xaa Xaa Xaa Xaa Xaa Xaa Xaa
            740                 745                 750

Xaa Xaa Xaa Xaa Xaa Xaa Xaa Xaa Xaa Xaa Xaa Xaa Xaa Xaa Xaa Xaa
        755                 760                 765

Xaa Xaa Xaa Xaa Xaa Xaa Xaa Xaa Xaa Xaa Xaa Xaa Xaa Xaa Xaa Xaa
    770                 775                 780

Xaa Xaa Xaa Xaa Xaa Xaa Xaa Xaa Xaa Xaa Xaa Xaa Xaa Xaa Xaa Xaa
785                 790                 795                 800

Xaa Xaa Xaa Xaa Xaa Xaa Xaa Xaa Xaa Xaa Xaa Xaa Xaa Xaa Xaa Xaa
                805                 810                 815

Xaa Xaa Xaa Xaa Xaa Xaa Xaa Xaa Xaa Xaa Xaa Xaa Xaa Xaa Xaa Xaa
            820                 825                 830

Xaa Xaa Xaa Xaa Xaa Xaa Xaa Xaa Xaa Xaa Xaa Xaa Xaa Xaa Xaa Xaa
        835                 840                 845

Xaa Xaa Xaa Xaa Xaa Xaa Xaa Xaa Xaa Xaa Xaa Xaa Xaa Xaa Xaa Xaa
    850                 855                 860

Xaa Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa Xaa
                885                 890                 895

Xaa Xaa Xaa Xaa Xaa Xaa Xaa Xaa Xaa Xaa Xaa Xaa Xaa Xaa Xaa Xaa
            900                 905                 910

Xaa Xaa Xaa Xaa Xaa Xaa Xaa Xaa Xaa Xaa Xaa Xaa Xaa Xaa Xaa Xaa
        915                 920                 925

Xaa Xaa Xaa Xaa Xaa Xaa Xaa Xaa Xaa Xaa Xaa Xaa Xaa Xaa Xaa Xaa
    930                 935                 940

Xaa Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa Xaa
                965                 970                 975

Xaa Xaa Xaa Xaa Xaa Xaa Xaa Xaa Xaa Xaa Xaa Xaa Xaa Xaa Xaa Xaa
            980                 985                 990

Xaa Xaa Xaa Xaa Xaa Xaa Xaa Xaa Xaa Xaa Xaa Xaa Xaa Xaa Xaa Xaa
        995                 1000                1005

Xaa Xaa Xaa Xaa Xaa Xaa Xaa Xaa Xaa Xaa Xaa Xaa Xaa Xaa Xaa Xaa
```

```
    1010                1015                1020

Xaa Xaa Xaa Xaa Xaa Xaa Xaa Xaa Xaa Xaa Xaa Xaa Xaa Xaa Xaa Xaa
1025                1030                1035                1040

Xaa Xaa Xaa Xaa Xaa Xaa Xaa Xaa Xaa Xaa Xaa Xaa Xaa Xaa Xaa Xaa
                1045                1050                1055

Xaa Xaa Xaa Xaa Xaa Xaa Xaa Xaa Xaa Xaa Xaa Xaa Xaa Xaa Xaa Xaa
            1060                1065                1070

Xaa Xaa Xaa Xaa Xaa Xaa Xaa Xaa Xaa Xaa Xaa Xaa Xaa Xaa Xaa Xaa
        1075                1080                1085

Xaa Xaa Xaa Xaa Xaa Xaa Xaa Xaa Xaa Xaa Xaa Xaa Xaa Xaa Xaa Xaa
    1090                1095                1100

Xaa Xaa Xaa Xaa Xaa Xaa Xaa Xaa Xaa Xaa Xaa Xaa Xaa Xaa Xaa Xaa
1105                1110                1115                1120

Xaa Xaa Xaa Xaa Xaa Xaa Xaa Xaa Xaa Xaa Xaa Xaa Xaa Xaa Xaa Xaa
                1125                1130                1135

Xaa Xaa Xaa Xaa Xaa Xaa Xaa Xaa Xaa Xaa Xaa Xaa Xaa Xaa Xaa Xaa
            1140                1145                1150

Xaa Xaa Xaa Xaa Xaa Xaa Xaa Xaa Xaa Xaa Xaa Xaa Xaa Xaa Xaa Xaa
        1155                1160                1165

Xaa Xaa Xaa Xaa Xaa Xaa Xaa Xaa Xaa Xaa Xaa Xaa Xaa Xaa Xaa Xaa
    1170                1175                1180

Xaa Xaa Xaa Xaa Xaa Xaa Xaa Xaa Xaa Xaa Xaa Xaa Xaa Xaa Xaa Xaa
1185                1190                1195                1200

Xaa Xaa Xaa Xaa Xaa Xaa Xaa Xaa Xaa Xaa Xaa Xaa Xaa Xaa Xaa Xaa
                1205                1210                1215

Xaa Xaa Xaa Xaa Xaa Xaa Xaa Xaa Xaa Xaa Xaa Xaa Xaa Xaa Xaa Xaa
            1220                1225                1230

Xaa Xaa Xaa Xaa Xaa Xaa Xaa Xaa Xaa Xaa Xaa Xaa Xaa Xaa Xaa Xaa
        1235                1240                1245

Xaa Xaa Xaa Xaa Xaa Xaa Xaa Xaa Xaa Xaa Xaa Xaa Xaa Xaa Xaa Xaa
    1250                1255                1260

Xaa Xaa Xaa Xaa Xaa Xaa Xaa Xaa Xaa Xaa Xaa Xaa Xaa Xaa Xaa Xaa
1265                1270                1275                1280

Xaa Xaa Xaa Xaa Xaa Xaa Xaa Xaa Xaa Xaa Xaa Xaa Xaa Xaa Xaa Xaa
                1285                1290                1295

Xaa Xaa Xaa Xaa Xaa Xaa Xaa Xaa Xaa Xaa Xaa Xaa Xaa Xaa Xaa Xaa
            1300                1305                1310

Xaa Xaa Xaa Xaa Xaa Xaa Xaa Xaa Xaa Xaa Xaa Xaa Xaa Xaa Xaa Xaa
        1315                1320                1325

Xaa Xaa Xaa Xaa Xaa Xaa Xaa Xaa Xaa Xaa Xaa Xaa Xaa Xaa Xaa Xaa
    1330                1335                1340

Xaa Xaa Xaa Xaa Xaa Xaa Xaa Xaa Xaa Xaa Xaa Xaa Xaa Xaa Xaa Xaa
1345                1350                1355                1360

Xaa Xaa Xaa Xaa Xaa Xaa Xaa Xaa Xaa Xaa Xaa Xaa Xaa Xaa Xaa Xaa
                1365                1370                1375

Xaa Xaa Xaa Xaa Xaa Xaa Xaa Xaa Xaa Xaa Xaa Xaa Xaa Xaa Xaa Xaa
            1380                1385                1390

Xaa Xaa Xaa Xaa Xaa Xaa Xaa Xaa Xaa Xaa Xaa Xaa Xaa Xaa Xaa Xaa
        1395                1400                1405

Xaa Xaa Xaa Xaa Xaa Xaa Xaa Xaa Xaa Xaa Xaa Xaa Xaa Xaa Xaa Xaa
    1410                1415                1420

Xaa Xaa Xaa Xaa Xaa Xaa Xaa Xaa Xaa Xaa Xaa Xaa Xaa Xaa Xaa Xaa
1425                1430                1435                1440
```

```
Xaa Xaa Xaa Xaa Xaa Xaa Xaa Xaa Xaa Xaa Xaa Xaa Xaa Xaa Xaa Xaa
                1445                1450                1455

Xaa Xaa Xaa Xaa Xaa Xaa Xaa Xaa Xaa Xaa Xaa Xaa Xaa Xaa Xaa Xaa
            1460                1465                1470

Xaa Xaa Xaa Xaa Xaa Xaa Xaa Xaa Xaa Xaa Xaa Xaa Xaa Xaa Xaa Xaa
        1475                1480                1485

Xaa Xaa Xaa Xaa Xaa Xaa Xaa Xaa Xaa Xaa Xaa Xaa Xaa Xaa Xaa Xaa
    1490                1495                1500

Xaa Xaa Xaa Xaa Xaa Xaa Xaa Xaa Xaa Xaa Xaa Xaa Xaa Xaa Xaa Xaa
1505                1510                1515                1520

Xaa Xaa Xaa Xaa Xaa Xaa Xaa Xaa Xaa Xaa Xaa Xaa Xaa Xaa Xaa Xaa
                1525                1530                1535

Xaa Xaa Xaa Xaa Xaa Xaa Xaa Xaa Xaa Xaa Xaa Xaa Xaa Xaa Xaa Xaa
            1540                1545                1550

Xaa Xaa Xaa Xaa Xaa Xaa Xaa Xaa Xaa Xaa Xaa Xaa Xaa Xaa Xaa Xaa
        1555                1560                1565

Xaa Xaa Xaa Xaa Xaa Xaa Xaa Xaa Xaa Xaa Xaa Xaa Xaa Xaa Xaa Xaa
    1570                1575                1580

Xaa Xaa Xaa Xaa Xaa Xaa Xaa Xaa Xaa Xaa Xaa Xaa Xaa Xaa Xaa Xaa
1585                1590                1595                1600

Xaa Xaa Xaa Xaa Xaa Xaa Xaa Xaa Xaa Xaa Xaa Xaa Xaa Xaa Xaa Xaa
                1605                1610                1615

Xaa Xaa Xaa Xaa Xaa Xaa Xaa Xaa Xaa Xaa Xaa Xaa Xaa Xaa Xaa Xaa
            1620                1625                1630

Xaa Xaa Xaa Xaa Xaa Xaa Xaa Xaa Xaa Xaa Xaa Xaa Xaa Xaa Xaa Xaa
        1635                1640                1645

Xaa Xaa Xaa Xaa Xaa Xaa Xaa Xaa Xaa Xaa Xaa Xaa Xaa Xaa Xaa Xaa
    1650                1655                1660

Xaa Xaa Xaa Xaa Xaa Xaa Xaa Xaa Xaa Xaa Xaa Xaa Xaa Xaa Xaa Xaa
1665                1670                1675                1680

Xaa Xaa Xaa Xaa Xaa Xaa Xaa Xaa Xaa Xaa Xaa Xaa Xaa Xaa Xaa Xaa
                1685                1690                1695

Xaa Xaa Xaa Xaa Xaa Xaa Xaa Xaa Xaa Xaa Xaa Xaa Xaa Xaa Xaa Xaa
            1700                1705                1710

Xaa Xaa Xaa Xaa Xaa Xaa Xaa Xaa Xaa Xaa Xaa Xaa Xaa Xaa Xaa Xaa
        1715                1720                1725

Xaa Xaa Xaa Xaa Xaa Xaa Xaa Xaa Xaa Xaa Xaa Xaa Xaa Xaa Xaa Xaa
    1730                1735                1740

Xaa Xaa Xaa Xaa Xaa Xaa Xaa Xaa Xaa Xaa Xaa Xaa Xaa Xaa Xaa Xaa
1745                1750                1755                1760

Xaa Xaa Xaa Xaa Xaa Xaa Xaa Xaa Xaa Xaa Xaa Xaa Xaa Xaa Xaa Xaa
                1765                1770                1775

Xaa Xaa Xaa Xaa Xaa Xaa Xaa Xaa Xaa Xaa Xaa Xaa Xaa Xaa Xaa Xaa
            1780                1785                1790

Xaa Xaa Xaa Xaa Xaa Xaa Xaa Xaa Xaa Xaa Xaa Xaa Xaa Xaa Xaa Xaa
        1795                1800                1805

Xaa Xaa Xaa Xaa Xaa Xaa Xaa Xaa Xaa Xaa Xaa Xaa Xaa Xaa Xaa Xaa
    1810                1815                1820

Xaa Xaa Xaa Xaa Xaa Xaa Xaa Xaa Xaa Xaa Xaa Xaa Xaa Xaa Xaa Xaa
1825                1830                1835                1840

Xaa Xaa Xaa Xaa Xaa Xaa Xaa Xaa Xaa Xaa Xaa Xaa Xaa Xaa Xaa Xaa
                1845                1850                1855
```

-continued

```
Xaa Xaa Xaa Xaa Xaa Xaa Xaa Xaa Xaa Xaa Xaa Xaa Xaa Xaa Xaa Xaa
            1860                1865                1870

Xaa Xaa Xaa Xaa Xaa Xaa Xaa Xaa Xaa Xaa Xaa Xaa Xaa Xaa Xaa Xaa
        1875                1880                1885

Xaa Xaa Xaa Xaa Xaa Xaa Xaa Xaa Xaa Xaa Xaa Xaa Xaa Xaa Xaa Xaa
    1890                1895                1900

Xaa Xaa Xaa Xaa Xaa Xaa Xaa Xaa Xaa Xaa Xaa Xaa Xaa Xaa Xaa Xaa
1905                1910                1915                1920

Xaa Xaa Xaa Xaa Xaa Xaa Xaa Xaa Xaa Xaa Xaa Xaa Xaa Xaa Xaa Xaa
                1925                1930                1935

Xaa Xaa Xaa Xaa Xaa Xaa Xaa Xaa Xaa Xaa Xaa Xaa Xaa Xaa Xaa Xaa
            1940                1945                1950

Xaa Xaa Xaa Xaa Xaa Xaa Xaa Xaa Xaa Xaa Xaa Xaa Xaa Xaa Xaa Xaa
        1955                1960                1965

Xaa Xaa Xaa Xaa Xaa Xaa Xaa Xaa Xaa Xaa Xaa Xaa Xaa Xaa Xaa Xaa
    1970                1975                1980

Xaa Xaa Xaa Xaa Xaa Xaa Xaa Xaa Xaa Xaa Xaa Xaa Xaa Xaa Xaa Xaa
1985                1990                1995                2000

Cys Xaa Xaa Xaa Xaa Xaa Xaa Xaa Xaa Xaa Cys Cys Xaa Xaa Xaa Xaa
                2005                2010                2015

Xaa Xaa Xaa Xaa Xaa Xaa Xaa Xaa Xaa Xaa Xaa Xaa Xaa Xaa Xaa Xaa
            2020                2025                2030

Xaa Xaa Xaa Xaa Xaa Xaa Xaa Xaa Xaa Xaa Xaa Xaa Xaa Xaa Xaa Xaa
        2035                2040                2045

Xaa Xaa Xaa Cys Xaa Xaa Xaa Xaa Xaa Xaa Xaa Xaa Xaa Xaa Xaa Xaa
    2050                2055                2060

Xaa Xaa Xaa Xaa Xaa Xaa Xaa Xaa Xaa Xaa Xaa Cys Xaa Xaa Xaa Xaa
2065                2070                2075                2080

Xaa Xaa Xaa Xaa Xaa Cys Cys Xaa Xaa Xaa Xaa Xaa Xaa Xaa Xaa Xaa
                2085                2090                2095

Xaa Xaa Xaa Xaa Xaa Xaa Xaa Xaa Xaa Cys Xaa Xaa Xaa Xaa Xaa Xaa
            2100                2105                2110

Xaa Xaa Xaa Xaa Xaa Xaa Xaa Xaa Xaa Xaa Xaa Xaa Xaa Xaa Xaa Xaa
        2115                2120                2125

Xaa Xaa Xaa Xaa Xaa Xaa Xaa Xaa Xaa Xaa Xaa Xaa Xaa Xaa Xaa Xaa
    2130                2135                2140

Xaa Xaa Xaa Xaa Xaa Xaa Xaa Xaa Xaa Xaa Xaa Xaa Xaa Xaa Xaa Xaa
2145                2150                2155                2160

Xaa Xaa Xaa Xaa Xaa Xaa Xaa Xaa Xaa Xaa Xaa Xaa Xaa Xaa Xaa Xaa
                2165                2170                2175

Xaa Xaa Xaa Xaa Xaa Xaa Xaa Xaa Xaa Xaa Xaa Xaa Xaa Xaa Xaa Xaa
            2180                2185                2190

Xaa Xaa Xaa Xaa Xaa Xaa Xaa Xaa Xaa Xaa Xaa Xaa Xaa Xaa Xaa Xaa
        2195                2200                2205

Xaa Xaa Xaa Xaa Xaa Xaa Xaa Xaa Xaa Xaa Xaa Xaa Xaa Xaa Xaa Xaa
    2210                2215                2220

Xaa Xaa Xaa Xaa Xaa Xaa Xaa Xaa Xaa Xaa Xaa Xaa Xaa Xaa Xaa Xaa
2225                2230                2235                2240

Xaa Xaa Xaa Xaa Xaa Xaa Xaa Xaa Xaa Xaa Xaa Xaa Xaa Xaa Xaa Xaa
                2245                2250                2255

Xaa Xaa Xaa Xaa Xaa Xaa Xaa Xaa Xaa Xaa Xaa Xaa Xaa Xaa Xaa Xaa
            2260                2265                2270

Xaa Xaa Xaa Xaa Xaa Xaa Xaa Xaa Xaa Xaa Xaa Xaa Xaa Xaa Xaa Xaa
```

```
        2275                2280                2285

Xaa Xaa Xaa Xaa Xaa Xaa Xaa Xaa Xaa Xaa Xaa Xaa Xaa Xaa Xaa Xaa
    2290                2295                2300

Xaa Xaa Xaa Xaa Xaa Xaa Xaa Xaa Xaa Xaa Xaa Xaa Xaa Xaa Xaa Xaa
2305                2310                2315                2320

Xaa Xaa Xaa Xaa Xaa Xaa Xaa Xaa Xaa Xaa Xaa Xaa Xaa Xaa Xaa Xaa
                2325                2330                2335

Xaa Xaa Xaa Xaa Xaa Xaa Xaa Xaa Xaa Xaa Xaa Xaa Xaa Xaa Xaa Xaa
            2340                2345                2350

Xaa Xaa Xaa Xaa Xaa Xaa Xaa Xaa Xaa Xaa Xaa Xaa Xaa Xaa Xaa Xaa
        2355                2360                2365

Xaa Xaa Xaa Xaa Xaa Xaa Xaa Xaa Xaa Xaa Xaa Xaa Xaa Xaa Xaa Xaa
    2370                2375                2380

Xaa Xaa Xaa Xaa Xaa Xaa Xaa Xaa Xaa Xaa Xaa Xaa Xaa Xaa Xaa Xaa
2385                2390                2395                2400

Xaa Xaa Xaa Xaa Xaa Xaa Xaa Xaa Xaa Xaa Xaa Xaa Xaa Xaa Xaa Xaa
                2405                2410                2415

Xaa Xaa Xaa Xaa Xaa Xaa Xaa Xaa Xaa Xaa Xaa Xaa Xaa Xaa Xaa Xaa
            2420                2425                2430

Xaa Xaa Xaa Xaa Xaa Xaa Xaa Xaa Xaa Xaa Xaa Xaa Xaa Xaa Xaa Xaa
        2435                2440                2445

Xaa Xaa Xaa Xaa Xaa Xaa Xaa Xaa Xaa Xaa Xaa Xaa Xaa Xaa Xaa Xaa
    2450                2455                2460

Xaa Xaa Xaa Xaa Xaa Xaa Xaa Xaa Xaa Xaa Xaa Xaa Xaa Xaa Xaa Xaa
2465                2470                2475                2480

Xaa Xaa Xaa Xaa Xaa Xaa Xaa Xaa Xaa Xaa Xaa Xaa Xaa Xaa Xaa Xaa
                2485                2490                2495

Xaa Xaa Xaa Xaa Xaa Xaa Xaa Xaa Xaa Xaa Xaa Xaa Xaa Xaa Xaa Xaa
            2500                2505                2510

Xaa Xaa Xaa Xaa Xaa Xaa Xaa Xaa Xaa Xaa Xaa Xaa Xaa Xaa Xaa Xaa
        2515                2520                2525

Xaa Xaa Xaa Xaa Xaa Xaa Xaa Xaa Xaa Xaa Xaa Xaa Xaa Xaa Xaa Xaa
    2530                2535                2540

Xaa Xaa Xaa Xaa Xaa Xaa Xaa Xaa Xaa Xaa Xaa Xaa Xaa Xaa Xaa Xaa
2545                2550                2555                2560

Xaa Xaa Xaa Xaa Xaa Xaa Xaa Xaa Xaa Xaa Xaa Xaa Xaa Xaa Xaa Xaa
                2565                2570                2575

Xaa Xaa Xaa Xaa Xaa Xaa Xaa Xaa Xaa Xaa Xaa Xaa Xaa Xaa Xaa Xaa
            2580                2585                2590

Xaa Xaa Xaa Xaa Xaa Xaa Xaa Xaa Xaa Xaa Xaa Xaa Xaa Xaa Xaa Xaa
        2595                2600                2605

Xaa Xaa Xaa Xaa Xaa Xaa Xaa Xaa Xaa Xaa Xaa Xaa Xaa Xaa Xaa Xaa
    2610                2615                2620

Xaa Xaa Xaa Xaa Xaa Xaa Xaa Xaa Xaa Xaa Xaa Xaa Xaa Xaa Xaa Xaa
2625                2630                2635                2640

Xaa Xaa Xaa Xaa Xaa Xaa Xaa Xaa Xaa Xaa Xaa Xaa Xaa Xaa Xaa Xaa
                2645                2650                2655

Xaa Xaa Xaa Xaa Xaa Xaa Xaa Xaa Xaa Xaa Xaa Xaa Xaa Xaa Xaa Xaa
            2660                2665                2670

Xaa Xaa Xaa Xaa Xaa Xaa Xaa Xaa Xaa Xaa Xaa Xaa Xaa Xaa Xaa Xaa
        2675                2680                2685

Xaa Xaa Xaa Xaa Xaa Xaa Xaa Xaa Xaa Xaa Xaa Xaa Xaa Xaa Xaa Xaa
    2690                2695                2700
```

```
Xaa Xaa Xaa Xaa Xaa Xaa Xaa Xaa Xaa Xaa Xaa Xaa Xaa Xaa Xaa Xaa
2705                2710                2715                2720

Xaa Xaa Xaa Xaa Xaa Xaa Xaa Xaa Xaa Xaa Xaa Xaa Xaa Xaa Xaa Xaa
                2725                2730                2735

Xaa Xaa Xaa Xaa Xaa Xaa Xaa Xaa Xaa Xaa Xaa Xaa Xaa Xaa Xaa Xaa
            2740                2745                2750

Xaa Xaa Xaa Xaa Xaa Xaa Xaa Xaa Xaa Xaa Xaa Xaa Xaa Xaa Xaa Xaa
        2755                2760                2765

Xaa Xaa Xaa Xaa Xaa Xaa Xaa Xaa Xaa Xaa Xaa Xaa Xaa Xaa Xaa Xaa
    2770                2775                2780

Xaa Xaa Xaa Xaa Xaa Xaa Xaa Xaa Xaa Xaa Xaa Xaa Xaa Xaa Xaa Xaa
2785                2790                2795                2800

Xaa Xaa Xaa Xaa Xaa Xaa Xaa Xaa Xaa Xaa Xaa Xaa Xaa Xaa Xaa Xaa
                2805                2810                2815

Xaa Xaa Xaa Xaa Xaa Xaa Xaa Xaa Xaa Xaa Xaa Xaa Xaa Xaa Xaa Xaa
            2820                2825                2830

Xaa Xaa Xaa Xaa Xaa Xaa Xaa Xaa Xaa Xaa Xaa Xaa Xaa Xaa Xaa Xaa
        2835                2840                2845

Xaa Xaa Xaa Xaa Xaa Xaa Xaa Xaa Xaa Xaa Xaa Xaa Xaa Xaa Xaa Xaa
    2850                2855                2860

Xaa Xaa Xaa Xaa Xaa Xaa Xaa Xaa Xaa Xaa Xaa Xaa Xaa Xaa Xaa Xaa
2865                2870                2875                2880

Xaa Xaa Xaa Xaa Xaa Xaa Xaa Xaa Xaa Xaa Xaa Xaa Xaa Xaa Xaa Xaa
                2885                2890                2895

Xaa Xaa Xaa Xaa Xaa Xaa Xaa Xaa Xaa Xaa Xaa Xaa Xaa Xaa Xaa Xaa
            2900                2905                2910

Xaa Xaa Xaa Xaa Xaa Xaa Xaa Xaa Xaa Xaa Xaa Xaa Xaa Xaa Xaa Xaa
        2915                2920                2925

Xaa Xaa Xaa Xaa Xaa Xaa Xaa Xaa Xaa Xaa Xaa Xaa Xaa Xaa Xaa Xaa
    2930                2935                2940

Xaa Xaa Xaa Xaa Xaa Xaa Xaa Xaa Xaa Xaa Xaa Xaa Xaa Xaa Xaa Xaa
2945                2950                2955                2960

Xaa Xaa Xaa Xaa Xaa Xaa Xaa Xaa Xaa Xaa Xaa Xaa Xaa Xaa Xaa Xaa
                2965                2970                2975

Xaa Xaa Xaa Xaa Xaa Xaa Xaa Xaa Xaa Xaa Xaa Xaa Xaa Xaa Xaa Xaa
            2980                2985                2990

Xaa Xaa Xaa Xaa Xaa Xaa Xaa Xaa Xaa Xaa Xaa Xaa Xaa Xaa Xaa Xaa
        2995                3000                3005

Xaa Xaa Xaa Xaa Xaa Xaa Xaa Xaa Xaa Xaa Xaa Xaa Xaa Xaa Xaa Xaa
    3010                3015                3020

Xaa Xaa Xaa Xaa Xaa Xaa Xaa Xaa Xaa Xaa Xaa Xaa Xaa Xaa Xaa Xaa
3025                3030                3035                3040

Xaa Xaa Xaa Xaa Xaa Xaa Xaa Xaa Xaa Xaa Xaa Xaa Xaa Xaa Xaa Xaa
                3045                3050                3055

Xaa Xaa Xaa Xaa Xaa Xaa Xaa Xaa Xaa Xaa Xaa Xaa Xaa Xaa Xaa Xaa
            3060                3065                3070

Xaa Xaa Xaa Xaa Xaa Xaa Xaa Xaa Xaa Xaa Xaa Xaa Xaa Xaa Xaa Xaa
        3075                3080                3085

Xaa Xaa Xaa Xaa Xaa Xaa Xaa Xaa Xaa Xaa Xaa Xaa Xaa Xaa Xaa Xaa
    3090                3095                3100

Xaa Xaa Xaa Xaa Xaa Xaa Xaa Xaa Xaa Xaa Xaa Xaa Xaa Xaa Xaa Xaa
3105                3110                3115                3120
```

-continued

```
Xaa Xaa Xaa Xaa Xaa Xaa Xaa Xaa Xaa Xaa Xaa Xaa Xaa Xaa Xaa Xaa
                3125                3130                3135

Xaa Xaa Xaa Xaa Xaa Xaa Xaa Xaa Xaa Xaa Xaa Xaa Xaa Xaa Xaa Xaa
            3140                3145                3150

Xaa Xaa Xaa Xaa Xaa Xaa Xaa Xaa Xaa Xaa Xaa Xaa Xaa Xaa Xaa Xaa
        3155                3160                3165

Xaa Xaa Xaa Xaa Xaa Xaa Xaa Xaa Xaa Xaa Xaa Xaa Xaa Xaa Xaa Xaa
    3170                3175                3180

Xaa Xaa Xaa Xaa Xaa Xaa Xaa Xaa Xaa Xaa Xaa Xaa Xaa Xaa Xaa Xaa
3185                3190                3195                3200

Xaa Xaa Xaa Xaa Xaa Xaa Xaa Xaa Xaa Xaa Xaa Xaa Xaa Xaa Xaa Xaa
                3205                3210                3215

Xaa Xaa Xaa Xaa Xaa Xaa Xaa Xaa Xaa Xaa Xaa Xaa Xaa Xaa Xaa Xaa
            3220                3225                3230

Xaa Xaa Xaa Xaa Xaa Xaa Xaa Xaa Xaa Xaa Xaa Xaa Xaa Xaa Xaa Xaa
        3235                3240                3245

Xaa Xaa Xaa Xaa Xaa Xaa Xaa Xaa Xaa Xaa Xaa Xaa Xaa Xaa Xaa Xaa
    3250                3255                3260

Xaa Xaa Xaa Xaa Xaa Xaa Xaa Xaa Xaa Xaa Xaa Xaa Xaa Xaa Xaa Xaa
3265                3270                3275                3280

Xaa Xaa Xaa Xaa Xaa Xaa Xaa Xaa Xaa Xaa Xaa Xaa Xaa Xaa Xaa Xaa
                3285                3290                3295

Xaa Xaa Xaa Xaa Xaa Xaa Xaa Xaa Xaa Xaa Xaa Xaa Xaa Xaa Xaa Xaa
            3300                3305                3310

Xaa Xaa Xaa Xaa Xaa Xaa Xaa Xaa Xaa Xaa Xaa Xaa Xaa Xaa Xaa Xaa
        3315                3320                3325

Xaa Xaa Xaa Xaa Xaa Xaa Xaa Xaa Xaa Xaa Xaa Xaa Xaa Xaa Xaa Xaa
    3330                3335                3340

Xaa Xaa Xaa Xaa Xaa Xaa Xaa Xaa Xaa Xaa Xaa Xaa Xaa Xaa Xaa Xaa
3345                3350                3355                3360

Xaa Xaa Xaa Xaa Xaa Xaa Xaa Xaa Xaa Xaa Xaa Xaa Xaa Xaa Xaa Xaa
                3365                3370                3375

Xaa Xaa Xaa Xaa Xaa Xaa Xaa Xaa Xaa Xaa Xaa Xaa Xaa Xaa Xaa Xaa
            3380                3385                3390

Xaa Xaa Xaa Xaa Xaa Xaa Xaa Xaa Xaa Xaa Xaa Xaa Xaa Xaa Xaa Xaa
        3395                3400                3405

Xaa Xaa Xaa Xaa Xaa Xaa Xaa Xaa Xaa Xaa Xaa Xaa Xaa Xaa Xaa Xaa
    3410                3415                3420

Xaa Xaa Xaa Xaa Xaa Xaa Xaa Xaa Xaa Xaa Xaa Xaa Xaa Xaa Xaa Xaa
3425                3430                3435                3440

Xaa Xaa Xaa Xaa Xaa Xaa Xaa Xaa Xaa Xaa Xaa Xaa Xaa Xaa Xaa Xaa
                3445                3450                3455

Xaa Xaa Xaa Xaa Xaa Xaa Xaa Xaa Xaa Xaa Xaa Xaa Xaa Xaa Xaa Xaa
            3460                3465                3470

Xaa Xaa Xaa Xaa Xaa Xaa Xaa Xaa Xaa Xaa Xaa Xaa Xaa Xaa Xaa Xaa
        3475                3480                3485

Xaa Xaa Xaa Xaa Xaa Xaa Xaa Xaa Xaa Xaa Xaa Xaa Xaa Xaa Xaa Xaa
    3490                3495                3500

Xaa Xaa Xaa Xaa Xaa Xaa Xaa Xaa Xaa Xaa Xaa Xaa Xaa Xaa Xaa Xaa
3505                3510                3515                3520

Xaa Xaa Xaa Xaa Xaa Xaa Xaa Xaa Xaa Xaa Xaa Xaa Xaa Xaa Xaa Xaa
                3525                3530                3535

Xaa Xaa Xaa Xaa Xaa Xaa Xaa Xaa Xaa Xaa Xaa Xaa Xaa Xaa Xaa Xaa
```

```
            3540                3545                3550

Xaa Xaa Xaa Xaa Xaa Xaa Xaa Xaa Xaa Xaa Xaa Xaa Xaa Xaa Xaa Xaa
        3555                3560                3565

Xaa Xaa Xaa Xaa Xaa Xaa Xaa Xaa Xaa Xaa Xaa Xaa Xaa Xaa Xaa Xaa
    3570                3575                3580

Xaa Xaa Xaa Xaa Xaa Xaa Xaa Xaa Xaa Xaa Xaa Xaa Xaa Xaa Xaa Xaa
3585                3590                3595                3600

Xaa Xaa Xaa Xaa Xaa Xaa Xaa Xaa Xaa Xaa Xaa Xaa Xaa Xaa Xaa Xaa
                3605                3610                3615

Xaa Xaa Xaa Xaa Xaa Xaa Xaa Xaa Xaa Xaa Xaa Xaa Xaa Xaa Xaa Xaa
            3620                3625                3630

Xaa Xaa Xaa Xaa Xaa Xaa Xaa Xaa Xaa Xaa Xaa Xaa Xaa Xaa Xaa Xaa
        3635                3640                3645

Xaa Xaa Xaa Xaa Xaa Xaa Xaa Xaa Xaa Xaa Xaa Xaa Xaa Xaa Xaa Xaa
    3650                3655                3660

Xaa Xaa Xaa Xaa Xaa Xaa Xaa Xaa Xaa Xaa Xaa Xaa Xaa Xaa Xaa Xaa
3665                3670                3675                3680

Xaa Xaa Xaa Xaa Xaa Xaa Xaa Xaa Xaa Xaa Xaa Xaa Xaa Xaa Xaa Xaa
                3685                3690                3695

Xaa Xaa Xaa Xaa Xaa Xaa Xaa Xaa Xaa Xaa Xaa Xaa Xaa Xaa Xaa Xaa
            3700                3705                3710

Xaa Xaa Xaa Xaa Xaa Xaa Xaa Xaa Xaa Xaa Xaa Xaa Xaa Xaa Xaa Xaa
        3715                3720                3725

Xaa Xaa Xaa Xaa Xaa Xaa Xaa Xaa Xaa Xaa Xaa Xaa Xaa Xaa Xaa Xaa
    3730                3735                3740

Xaa Xaa Xaa Xaa Xaa Xaa Xaa Xaa Xaa Xaa Xaa Xaa Xaa Xaa Xaa Xaa
3745                3750                3755                3760

Xaa Xaa Xaa Xaa Xaa Xaa Xaa Xaa Xaa Xaa Xaa Xaa Xaa Xaa Xaa Xaa
                3765                3770                3775

Xaa Xaa Xaa Xaa Xaa Xaa Xaa Xaa Xaa Xaa Xaa Xaa Xaa Xaa Xaa Xaa
            3780                3785                3790

Xaa Xaa Xaa Xaa Xaa Xaa Xaa Xaa Xaa Xaa Xaa Xaa Xaa Xaa Xaa Xaa
        3795                3800                3805

Xaa Xaa Xaa Xaa Xaa Xaa Xaa Xaa Xaa Xaa Xaa Xaa Xaa Xaa Xaa Xaa
    3810                3815                3820

Xaa Xaa Xaa Xaa Xaa Xaa Xaa Xaa Xaa Xaa Xaa Xaa Xaa Xaa Xaa Xaa
3825                3830                3835                3840

Xaa Xaa Xaa Xaa Xaa Xaa Xaa Xaa Xaa Xaa Xaa Xaa Xaa Xaa Xaa Xaa
                3845                3850                3855

Xaa Xaa Xaa Xaa Xaa Xaa Xaa Xaa Xaa Xaa Xaa Xaa Xaa Xaa Xaa Xaa
            3860                3865                3870

Xaa Xaa Xaa Xaa Xaa Xaa Xaa Xaa Xaa Xaa Xaa Xaa Xaa Xaa Xaa Xaa
        3875                3880                3885

Xaa Xaa Xaa Xaa Xaa Xaa Xaa Xaa Xaa Xaa Xaa Xaa Xaa Xaa Xaa Xaa
    3890                3895                3900

Xaa Xaa Xaa Xaa Xaa Xaa Xaa Xaa Xaa Xaa Xaa Xaa Xaa Xaa Xaa Xaa
3905                3910                3915                3920

Xaa Xaa Xaa Xaa Xaa Xaa Xaa Xaa Xaa Xaa Xaa Xaa Xaa Xaa Xaa Xaa
                3925                3930                3935

Xaa Xaa Xaa Xaa Xaa Xaa Xaa Xaa Xaa Xaa Xaa Xaa Xaa Xaa Xaa Xaa
            3940                3945                3950

Xaa Xaa Xaa Xaa Xaa Xaa Xaa Xaa Xaa Xaa Xaa Xaa Xaa Xaa Xaa Xaa
        3955                3960                3965
```

```
Xaa Xaa Xaa Xaa Xaa Xaa Xaa Xaa Xaa Xaa Xaa Xaa Xaa Xaa Xaa Xaa
    3970                3975                3980

Xaa Xaa Xaa Xaa Xaa Xaa Xaa Xaa Xaa Xaa Xaa Xaa Xaa Xaa Xaa Xaa
3985                3990                3995                4000

Xaa Xaa Xaa Xaa Xaa Xaa Xaa Xaa Xaa Xaa Xaa Xaa Xaa Xaa Xaa Xaa
                4005                4010                4015

Xaa Xaa Xaa Xaa Xaa Xaa Xaa Xaa Xaa Xaa Xaa Xaa Xaa Xaa Xaa Xaa
            4020                4025                4030

Xaa Xaa Xaa Xaa Xaa Xaa Xaa Xaa Xaa Xaa Xaa Xaa Xaa Xaa Xaa Xaa
        4035                4040                4045

Xaa Xaa Xaa Xaa Xaa Xaa Xaa Xaa Xaa Xaa Xaa Xaa Xaa Xaa Xaa Xaa
    4050                4055                4060

Xaa Xaa Xaa Xaa Xaa Xaa Xaa Xaa Xaa Xaa Xaa Xaa Xaa Xaa Xaa Xaa
4065                4070                4075                4080

Xaa Xaa Xaa Xaa Xaa Xaa Xaa Xaa Xaa Xaa Xaa Xaa Xaa Xaa Xaa Xaa
                4085                4090                4095

Xaa Xaa Xaa Xaa Xaa Xaa Xaa Xaa Xaa Xaa
            4100                4105
```

<210> SEQ ID NO 2
<211> LENGTH: 4368
<212> TYPE: PRT
<213> ORGANISM: Artificial
<220> FEATURE:
<223> OTHER INFORMATION: Exemplary sequence used to illustrate invention.
<220> FEATURE:
<221> NAME/KEY: REPEAT
<222> LOCATION: (1)..(2000)
<223> OTHER INFORMATION: Xaa is any amino acid and can be shown 1 to 2000 times.
<220> FEATURE:
<221> NAME/KEY: REPEAT
<222> LOCATION: (2002)..(2051)
<223> OTHER INFORMATION: Xaa is any amino acid and can be shown 1 to 50 times.
<220> FEATURE:
<221> NAME/KEY: REPEAT
<222> LOCATION: (2053)..(2057)
<223> OTHER INFORMATION: Xaa is any amino acid and can be shown 0 to 5 times.
<220> FEATURE:
<221> NAME/KEY: REPEAT
<222> LOCATION: (2059)..(2158)
<223> OTHER INFORMATION: Xaa is any amino acid and can be shown 1 to 100 times.
<220> FEATURE:
<221> NAME/KEY: REPEAT
<222> LOCATION: (2160)..(2259)
<223> OTHER INFORMATION: Xaa is any amino acid and can be shown 1 to 100 times.
<220> FEATURE:
<221> NAME/KEY: REPEAT
<222> LOCATION: (2261)..(2310)
<223> OTHER INFORMATION: Xaa is any amino acid and can be shown 1 to 50 times.
<220> FEATURE:
<221> NAME/KEY: REPEAT
<222> LOCATION: (2312)..(2316)
<223> OTHER INFORMATION: Xaa is any amino acid and can be shown 0 to 5 times.
<220> FEATURE:
<221> NAME/KEY: REPEAT
<222> LOCATION: (2318)..(2367)
<223> OTHER INFORMATION: Xaa is any amino acid and can be shown 1 to 50 times.
<220> FEATURE:
<221> NAME/KEY: REPEAT
<222> LOCATION: (2369)..(4368)

```
<223> OTHER INFORMATION: Xaa is any amino acid and can be shown 1 to
      2000 times.

<400> SEQUENCE: 2

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa Xaa
    50                  55                  60

Xaa Xaa Xaa Xaa Xaa Xaa Xaa Xaa Xaa Xaa Xaa Xaa Xaa Xaa Xaa Xaa
65                  70                  75                  80

Xaa Xaa Xaa Xaa Xaa Xaa Xaa Xaa Xaa Xaa Xaa Xaa Xaa Xaa Xaa Xaa
                85                  90                  95

Xaa Xaa Xaa Xaa Xaa Xaa Xaa Xaa Xaa Xaa Xaa Xaa Xaa Xaa Xaa Xaa
            100                 105                 110

Xaa Xaa Xaa Xaa Xaa Xaa Xaa Xaa Xaa Xaa Xaa Xaa Xaa Xaa Xaa Xaa
        115                 120                 125

Xaa Xaa Xaa Xaa Xaa Xaa Xaa Xaa Xaa Xaa Xaa Xaa Xaa Xaa Xaa Xaa
    130                 135                 140

Xaa Xaa Xaa Xaa Xaa Xaa Xaa Xaa Xaa Xaa Xaa Xaa Xaa Xaa Xaa Xaa
145                 150                 155                 160

Xaa Xaa Xaa Xaa Xaa Xaa Xaa Xaa Xaa Xaa Xaa Xaa Xaa Xaa Xaa Xaa
                165                 170                 175

Xaa Xaa Xaa Xaa Xaa Xaa Xaa Xaa Xaa Xaa Xaa Xaa Xaa Xaa Xaa Xaa
            180                 185                 190

Xaa Xaa Xaa Xaa Xaa Xaa Xaa Xaa Xaa Xaa Xaa Xaa Xaa Xaa Xaa Xaa
        195                 200                 205

Xaa Xaa Xaa Xaa Xaa Xaa Xaa Xaa Xaa Xaa Xaa Xaa Xaa Xaa Xaa Xaa
    210                 215                 220

Xaa Xaa Xaa Xaa Xaa Xaa Xaa Xaa Xaa Xaa Xaa Xaa Xaa Xaa Xaa Xaa
225                 230                 235                 240

Xaa Xaa Xaa Xaa Xaa Xaa Xaa Xaa Xaa Xaa Xaa Xaa Xaa Xaa Xaa Xaa
                245                 250                 255

Xaa Xaa Xaa Xaa Xaa Xaa Xaa Xaa Xaa Xaa Xaa Xaa Xaa Xaa Xaa Xaa
            260                 265                 270

Xaa Xaa Xaa Xaa Xaa Xaa Xaa Xaa Xaa Xaa Xaa Xaa Xaa Xaa Xaa Xaa
        275                 280                 285

Xaa Xaa Xaa Xaa Xaa Xaa Xaa Xaa Xaa Xaa Xaa Xaa Xaa Xaa Xaa Xaa
    290                 295                 300

Xaa Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa Xaa
                325                 330                 335

Xaa Xaa Xaa Xaa Xaa Xaa Xaa Xaa Xaa Xaa Xaa Xaa Xaa Xaa Xaa Xaa
            340                 345                 350

Xaa Xaa Xaa Xaa Xaa Xaa Xaa Xaa Xaa Xaa Xaa Xaa Xaa Xaa Xaa Xaa
        355                 360                 365

Xaa Xaa Xaa Xaa Xaa Xaa Xaa Xaa Xaa Xaa Xaa Xaa Xaa Xaa Xaa Xaa
    370                 375                 380

Xaa Xaa Xaa Xaa Xaa Xaa Xaa Xaa Xaa Xaa Xaa Xaa Xaa Xaa Xaa Xaa
385                 390                 395                 400
```

```
Xaa Xaa Xaa Xaa Xaa Xaa Xaa Xaa Xaa Xaa Xaa Xaa Xaa Xaa Xaa Xaa
                405                 410                 415

Xaa Xaa Xaa Xaa Xaa Xaa Xaa Xaa Xaa Xaa Xaa Xaa Xaa Xaa Xaa Xaa
            420                 425                 430

Xaa Xaa Xaa Xaa Xaa Xaa Xaa Xaa Xaa Xaa Xaa Xaa Xaa Xaa Xaa Xaa
        435                 440                 445

Xaa Xaa Xaa Xaa Xaa Xaa Xaa Xaa Xaa Xaa Xaa Xaa Xaa Xaa Xaa Xaa
    450                 455                 460

Xaa Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa Xaa
                485                 490                 495

Xaa Xaa Xaa Xaa Xaa Xaa Xaa Xaa Xaa Xaa Xaa Xaa Xaa Xaa Xaa Xaa
            500                 505                 510

Xaa Xaa Xaa Xaa Xaa Xaa Xaa Xaa Xaa Xaa Xaa Xaa Xaa Xaa Xaa Xaa
        515                 520                 525

Xaa Xaa Xaa Xaa Xaa Xaa Xaa Xaa Xaa Xaa Xaa Xaa Xaa Xaa Xaa Xaa
    530                 535                 540

Xaa Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa Xaa
                565                 570                 575

Xaa Xaa Xaa Xaa Xaa Xaa Xaa Xaa Xaa Xaa Xaa Xaa Xaa Xaa Xaa Xaa
            580                 585                 590

Xaa Xaa Xaa Xaa Xaa Xaa Xaa Xaa Xaa Xaa Xaa Xaa Xaa Xaa Xaa Xaa
        595                 600                 605

Xaa Xaa Xaa Xaa Xaa Xaa Xaa Xaa Xaa Xaa Xaa Xaa Xaa Xaa Xaa Xaa
    610                 615                 620

Xaa Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa Xaa
                645                 650                 655

Xaa Xaa Xaa Xaa Xaa Xaa Xaa Xaa Xaa Xaa Xaa Xaa Xaa Xaa Xaa Xaa
            660                 665                 670

Xaa Xaa Xaa Xaa Xaa Xaa Xaa Xaa Xaa Xaa Xaa Xaa Xaa Xaa Xaa Xaa
        675                 680                 685

Xaa Xaa Xaa Xaa Xaa Xaa Xaa Xaa Xaa Xaa Xaa Xaa Xaa Xaa Xaa Xaa
    690                 695                 700

Xaa Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa Xaa
                725                 730                 735

Xaa Xaa Xaa Xaa Xaa Xaa Xaa Xaa Xaa Xaa Xaa Xaa Xaa Xaa Xaa Xaa
            740                 745                 750

Xaa Xaa Xaa Xaa Xaa Xaa Xaa Xaa Xaa Xaa Xaa Xaa Xaa Xaa Xaa Xaa
        755                 760                 765

Xaa Xaa Xaa Xaa Xaa Xaa Xaa Xaa Xaa Xaa Xaa Xaa Xaa Xaa Xaa Xaa
    770                 775                 780

Xaa Xaa Xaa Xaa Xaa Xaa Xaa Xaa Xaa Xaa Xaa Xaa Xaa Xaa Xaa Xaa
785                 790                 795                 800

Xaa Xaa Xaa Xaa Xaa Xaa Xaa Xaa Xaa Xaa Xaa Xaa Xaa Xaa Xaa Xaa
                805                 810                 815
```

-continued

```
Xaa Xaa Xaa Xaa Xaa Xaa Xaa Xaa Xaa Xaa Xaa Xaa Xaa Xaa Xaa Xaa
            820                 825                 830

Xaa Xaa Xaa Xaa Xaa Xaa Xaa Xaa Xaa Xaa Xaa Xaa Xaa Xaa Xaa
        835                 840                 845

Xaa Xaa Xaa Xaa Xaa Xaa Xaa Xaa Xaa Xaa Xaa Xaa Xaa Xaa Xaa Xaa
    850                 855                 860

Xaa Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa Xaa
                885                 890                 895

Xaa Xaa Xaa Xaa Xaa Xaa Xaa Xaa Xaa Xaa Xaa Xaa Xaa Xaa Xaa Xaa
            900                 905                 910

Xaa Xaa Xaa Xaa Xaa Xaa Xaa Xaa Xaa Xaa Xaa Xaa Xaa Xaa Xaa Xaa
        915                 920                 925

Xaa Xaa Xaa Xaa Xaa Xaa Xaa Xaa Xaa Xaa Xaa Xaa Xaa Xaa Xaa Xaa
    930                 935                 940

Xaa Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa Xaa
                965                 970                 975

Xaa Xaa Xaa Xaa Xaa Xaa Xaa Xaa Xaa Xaa Xaa Xaa Xaa Xaa Xaa Xaa
            980                 985                 990

Xaa Xaa Xaa Xaa Xaa Xaa Xaa Xaa Xaa Xaa Xaa Xaa Xaa Xaa Xaa Xaa
        995                 1000                1005

Xaa Xaa Xaa Xaa Xaa Xaa Xaa Xaa Xaa Xaa Xaa Xaa Xaa Xaa Xaa Xaa
    1010                1015                1020

Xaa Xaa Xaa Xaa Xaa Xaa Xaa Xaa Xaa Xaa Xaa Xaa Xaa Xaa Xaa Xaa
1025                1030                1035                1040

Xaa Xaa Xaa Xaa Xaa Xaa Xaa Xaa Xaa Xaa Xaa Xaa Xaa Xaa Xaa Xaa
                1045                1050                1055

Xaa Xaa Xaa Xaa Xaa Xaa Xaa Xaa Xaa Xaa Xaa Xaa Xaa Xaa Xaa Xaa
            1060                1065                1070

Xaa Xaa Xaa Xaa Xaa Xaa Xaa Xaa Xaa Xaa Xaa Xaa Xaa Xaa Xaa Xaa
        1075                1080                1085

Xaa Xaa Xaa Xaa Xaa Xaa Xaa Xaa Xaa Xaa Xaa Xaa Xaa Xaa Xaa Xaa
    1090                1095                1100

Xaa Xaa Xaa Xaa Xaa Xaa Xaa Xaa Xaa Xaa Xaa Xaa Xaa Xaa Xaa Xaa
1105                1110                1115                1120

Xaa Xaa Xaa Xaa Xaa Xaa Xaa Xaa Xaa Xaa Xaa Xaa Xaa Xaa Xaa Xaa
                1125                1130                1135

Xaa Xaa Xaa Xaa Xaa Xaa Xaa Xaa Xaa Xaa Xaa Xaa Xaa Xaa Xaa Xaa
            1140                1145                1150

Xaa Xaa Xaa Xaa Xaa Xaa Xaa Xaa Xaa Xaa Xaa Xaa Xaa Xaa Xaa Xaa
        1155                1160                1165

Xaa Xaa Xaa Xaa Xaa Xaa Xaa Xaa Xaa Xaa Xaa Xaa Xaa Xaa Xaa Xaa
    1170                1175                1180

Xaa Xaa Xaa Xaa Xaa Xaa Xaa Xaa Xaa Xaa Xaa Xaa Xaa Xaa Xaa Xaa
1185                1190                1195                1200

Xaa Xaa Xaa Xaa Xaa Xaa Xaa Xaa Xaa Xaa Xaa Xaa Xaa Xaa Xaa Xaa
                1205                1210                1215

Xaa Xaa Xaa Xaa Xaa Xaa Xaa Xaa Xaa Xaa Xaa Xaa Xaa Xaa Xaa Xaa
            1220                1225                1230

Xaa Xaa Xaa Xaa Xaa Xaa Xaa Xaa Xaa Xaa Xaa Xaa Xaa Xaa Xaa Xaa
```

1235 1240 1245

Xaa Xaa Xaa Xaa Xaa Xaa Xaa Xaa Xaa Xaa Xaa Xaa Xaa Xaa Xaa Xaa
1250 1255 1260

Xaa Xaa Xaa Xaa Xaa Xaa Xaa Xaa Xaa Xaa Xaa Xaa Xaa Xaa Xaa Xaa
1265 1270 1275 1280

Xaa Xaa Xaa Xaa Xaa Xaa Xaa Xaa Xaa Xaa Xaa Xaa Xaa Xaa Xaa Xaa
1285 1290 1295

Xaa Xaa Xaa Xaa Xaa Xaa Xaa Xaa Xaa Xaa Xaa Xaa Xaa Xaa Xaa Xaa
1300 1305 1310

Xaa Xaa Xaa Xaa Xaa Xaa Xaa Xaa Xaa Xaa Xaa Xaa Xaa Xaa Xaa Xaa
1315 1320 1325

Xaa Xaa Xaa Xaa Xaa Xaa Xaa Xaa Xaa Xaa Xaa Xaa Xaa Xaa Xaa Xaa
1330 1335 1340

Xaa Xaa Xaa Xaa Xaa Xaa Xaa Xaa Xaa Xaa Xaa Xaa Xaa Xaa Xaa Xaa
1345 1350 1355 1360

Xaa Xaa Xaa Xaa Xaa Xaa Xaa Xaa Xaa Xaa Xaa Xaa Xaa Xaa Xaa Xaa
1365 1370 1375

Xaa Xaa Xaa Xaa Xaa Xaa Xaa Xaa Xaa Xaa Xaa Xaa Xaa Xaa Xaa Xaa
1380 1385 1390

Xaa Xaa Xaa Xaa Xaa Xaa Xaa Xaa Xaa Xaa Xaa Xaa Xaa Xaa Xaa Xaa
1395 1400 1405

Xaa Xaa Xaa Xaa Xaa Xaa Xaa Xaa Xaa Xaa Xaa Xaa Xaa Xaa Xaa Xaa
1410 1415 1420

Xaa Xaa Xaa Xaa Xaa Xaa Xaa Xaa Xaa Xaa Xaa Xaa Xaa Xaa Xaa Xaa
1425 1430 1435 1440

Xaa Xaa Xaa Xaa Xaa Xaa Xaa Xaa Xaa Xaa Xaa Xaa Xaa Xaa Xaa Xaa
1445 1450 1455

Xaa Xaa Xaa Xaa Xaa Xaa Xaa Xaa Xaa Xaa Xaa Xaa Xaa Xaa Xaa Xaa
1460 1465 1470

Xaa Xaa Xaa Xaa Xaa Xaa Xaa Xaa Xaa Xaa Xaa Xaa Xaa Xaa Xaa Xaa
1475 1480 1485

Xaa Xaa Xaa Xaa Xaa Xaa Xaa Xaa Xaa Xaa Xaa Xaa Xaa Xaa Xaa Xaa
1490 1495 1500

Xaa Xaa Xaa Xaa Xaa Xaa Xaa Xaa Xaa Xaa Xaa Xaa Xaa Xaa Xaa Xaa
1505 1510 1515 1520

Xaa Xaa Xaa Xaa Xaa Xaa Xaa Xaa Xaa Xaa Xaa Xaa Xaa Xaa Xaa Xaa
1525 1530 1535

Xaa Xaa Xaa Xaa Xaa Xaa Xaa Xaa Xaa Xaa Xaa Xaa Xaa Xaa Xaa Xaa
1540 1545 1550

Xaa Xaa Xaa Xaa Xaa Xaa Xaa Xaa Xaa Xaa Xaa Xaa Xaa Xaa Xaa Xaa
1555 1560 1565

Xaa Xaa Xaa Xaa Xaa Xaa Xaa Xaa Xaa Xaa Xaa Xaa Xaa Xaa Xaa Xaa
1570 1575 1580

Xaa Xaa Xaa Xaa Xaa Xaa Xaa Xaa Xaa Xaa Xaa Xaa Xaa Xaa Xaa Xaa
1585 1590 1595 1600

Xaa Xaa Xaa Xaa Xaa Xaa Xaa Xaa Xaa Xaa Xaa Xaa Xaa Xaa Xaa Xaa
1605 1610 1615

Xaa Xaa Xaa Xaa Xaa Xaa Xaa Xaa Xaa Xaa Xaa Xaa Xaa Xaa Xaa Xaa
1620 1625 1630

Xaa Xaa Xaa Xaa Xaa Xaa Xaa Xaa Xaa Xaa Xaa Xaa Xaa Xaa Xaa Xaa
1635 1640 1645

Xaa Xaa Xaa Xaa Xaa Xaa Xaa Xaa Xaa Xaa Xaa Xaa Xaa Xaa Xaa Xaa
1650 1655 1660

```
Xaa Xaa Xaa Xaa Xaa Xaa Xaa Xaa Xaa Xaa Xaa Xaa Xaa Xaa Xaa Xaa
1665                1670                1675                1680

Xaa Xaa Xaa Xaa Xaa Xaa Xaa Xaa Xaa Xaa Xaa Xaa Xaa Xaa Xaa Xaa
                1685                1690                1695

Xaa Xaa Xaa Xaa Xaa Xaa Xaa Xaa Xaa Xaa Xaa Xaa Xaa Xaa Xaa Xaa
            1700                1705                1710

Xaa Xaa Xaa Xaa Xaa Xaa Xaa Xaa Xaa Xaa Xaa Xaa Xaa Xaa Xaa Xaa
        1715                1720                1725

Xaa Xaa Xaa Xaa Xaa Xaa Xaa Xaa Xaa Xaa Xaa Xaa Xaa Xaa Xaa Xaa
    1730                1735                1740

Xaa Xaa Xaa Xaa Xaa Xaa Xaa Xaa Xaa Xaa Xaa Xaa Xaa Xaa Xaa Xaa
1745                1750                1755                1760

Xaa Xaa Xaa Xaa Xaa Xaa Xaa Xaa Xaa Xaa Xaa Xaa Xaa Xaa Xaa Xaa
                1765                1770                1775

Xaa Xaa Xaa Xaa Xaa Xaa Xaa Xaa Xaa Xaa Xaa Xaa Xaa Xaa Xaa Xaa
            1780                1785                1790

Xaa Xaa Xaa Xaa Xaa Xaa Xaa Xaa Xaa Xaa Xaa Xaa Xaa Xaa Xaa Xaa
        1795                1800                1805

Xaa Xaa Xaa Xaa Xaa Xaa Xaa Xaa Xaa Xaa Xaa Xaa Xaa Xaa Xaa Xaa
    1810                1815                1820

Xaa Xaa Xaa Xaa Xaa Xaa Xaa Xaa Xaa Xaa Xaa Xaa Xaa Xaa Xaa Xaa
1825                1830                1835                1840

Xaa Xaa Xaa Xaa Xaa Xaa Xaa Xaa Xaa Xaa Xaa Xaa Xaa Xaa Xaa Xaa
                1845                1850                1855

Xaa Xaa Xaa Xaa Xaa Xaa Xaa Xaa Xaa Xaa Xaa Xaa Xaa Xaa Xaa Xaa
            1860                1865                1870

Xaa Xaa Xaa Xaa Xaa Xaa Xaa Xaa Xaa Xaa Xaa Xaa Xaa Xaa Xaa Xaa
        1875                1880                1885

Xaa Xaa Xaa Xaa Xaa Xaa Xaa Xaa Xaa Xaa Xaa Xaa Xaa Xaa Xaa Xaa
    1890                1895                1900

Xaa Xaa Xaa Xaa Xaa Xaa Xaa Xaa Xaa Xaa Xaa Xaa Xaa Xaa Xaa Xaa
1905                1910                1915                1920

Xaa Xaa Xaa Xaa Xaa Xaa Xaa Xaa Xaa Xaa Xaa Xaa Xaa Xaa Xaa Xaa
                1925                1930                1935

Xaa Xaa Xaa Xaa Xaa Xaa Xaa Xaa Xaa Xaa Xaa Xaa Xaa Xaa Xaa Xaa
            1940                1945                1950

Xaa Xaa Xaa Xaa Xaa Xaa Xaa Xaa Xaa Xaa Xaa Xaa Xaa Xaa Xaa Xaa
        1955                1960                1965

Xaa Xaa Xaa Xaa Xaa Xaa Xaa Xaa Xaa Xaa Xaa Xaa Xaa Xaa Xaa Xaa
    1970                1975                1980

Xaa Xaa Xaa Xaa Xaa Xaa Xaa Xaa Xaa Xaa Xaa Xaa Xaa Xaa Xaa Xaa
1985                1990                1995                2000

Cys Xaa Xaa Xaa Xaa Xaa Xaa Xaa Xaa Xaa Xaa Xaa Xaa Xaa Xaa Xaa
                2005                2010                2015

Xaa Xaa Xaa Xaa Xaa Xaa Xaa Xaa Xaa Xaa Xaa Xaa Xaa Xaa Xaa Xaa
            2020                2025                2030

Xaa Xaa Xaa Xaa Xaa Xaa Xaa Xaa Xaa Xaa Xaa Xaa Xaa Xaa Xaa Xaa
        2035                2040                2045

Xaa Xaa Xaa Cys Xaa Xaa Xaa Xaa Xaa Cys Xaa Xaa Xaa Xaa Xaa Xaa
    2050                2055                2060

Xaa Xaa Xaa Xaa Xaa Xaa Xaa Xaa Xaa Xaa Xaa Xaa Xaa Xaa Xaa Xaa
2065                2070                2075                2080
```

```
Xaa Xaa Xaa Xaa Xaa Xaa Xaa Xaa Xaa Xaa Xaa Xaa Xaa Xaa Xaa Xaa
                2085                2090                2095

Xaa Xaa Xaa Xaa Xaa Xaa Xaa Xaa Xaa Xaa Xaa Xaa Xaa Xaa Xaa Xaa
            2100                2105                2110

Xaa Xaa Xaa Xaa Xaa Xaa Xaa Xaa Xaa Xaa Xaa Xaa Xaa Xaa Xaa Xaa
        2115                2120                2125

Xaa Xaa Xaa Xaa Xaa Xaa Xaa Xaa Xaa Xaa Xaa Xaa Xaa Xaa Xaa Xaa
    2130                2135                2140

Xaa Xaa Xaa Xaa Xaa Xaa Xaa Xaa Xaa Xaa Xaa Xaa Xaa Xaa Cys Xaa
2145                2150                2155                2160

Xaa Xaa Xaa Xaa Xaa Xaa Xaa Xaa Xaa Xaa Xaa Xaa Xaa Xaa Xaa Xaa
                2165                2170                2175

Xaa Xaa Xaa Xaa Xaa Xaa Xaa Xaa Xaa Xaa Xaa Xaa Xaa Xaa Xaa Xaa
            2180                2185                2190

Xaa Xaa Xaa Xaa Xaa Xaa Xaa Xaa Xaa Xaa Xaa Xaa Xaa Xaa Xaa Xaa
        2195                2200                2205

Xaa Xaa Xaa Xaa Xaa Xaa Xaa Xaa Xaa Xaa Xaa Xaa Xaa Xaa Xaa Xaa
    2210                2215                2220

Xaa Xaa Xaa Xaa Xaa Xaa Xaa Xaa Xaa Xaa Xaa Xaa Xaa Xaa Xaa Xaa
2225                2230                2235                2240

Xaa Xaa Xaa Xaa Xaa Xaa Xaa Xaa Xaa Xaa Xaa Xaa Xaa Xaa Xaa Xaa
                2245                2250                2255

Xaa Xaa Xaa Cys Xaa Xaa Xaa Xaa Xaa Xaa Xaa Xaa Xaa Xaa Xaa Xaa
            2260                2265                2270

Xaa Xaa Xaa Xaa Xaa Xaa Xaa Xaa Xaa Xaa Xaa Xaa Xaa Xaa Xaa Xaa
        2275                2280                2285

Xaa Xaa Xaa Xaa Xaa Xaa Xaa Xaa Xaa Xaa Xaa Xaa Xaa Xaa Xaa Xaa
    2290                2295                2300

Xaa Xaa Xaa Xaa Xaa Xaa Cys Xaa Xaa Xaa Xaa Xaa Cys Xaa Xaa Xaa
2305                2310                2315                2320

Xaa Xaa Xaa Xaa Xaa Xaa Xaa Xaa Xaa Xaa Xaa Xaa Xaa Xaa Xaa Xaa
                2325                2330                2335

Xaa Xaa Xaa Xaa Xaa Xaa Xaa Xaa Xaa Xaa Xaa Xaa Xaa Xaa Xaa Xaa
            2340                2345                2350

Xaa Xaa Xaa Xaa Xaa Xaa Xaa Xaa Xaa Xaa Xaa Xaa Xaa Xaa Xaa Cys
        2355                2360                2365

Xaa Xaa Xaa Xaa Xaa Xaa Xaa Xaa Xaa Xaa Xaa Xaa Xaa Xaa Xaa Xaa
    2370                2375                2380

Xaa Xaa Xaa Xaa Xaa Xaa Xaa Xaa Xaa Xaa Xaa Xaa Xaa Xaa Xaa Xaa
2385                2390                2395                2400

Xaa Xaa Xaa Xaa Xaa Xaa Xaa Xaa Xaa Xaa Xaa Xaa Xaa Xaa Xaa Xaa
                2405                2410                2415

Xaa Xaa Xaa Xaa Xaa Xaa Xaa Xaa Xaa Xaa Xaa Xaa Xaa Xaa Xaa Xaa
            2420                2425                2430

Xaa Xaa Xaa Xaa Xaa Xaa Xaa Xaa Xaa Xaa Xaa Xaa Xaa Xaa Xaa Xaa
        2435                2440                2445

Xaa Xaa Xaa Xaa Xaa Xaa Xaa Xaa Xaa Xaa Xaa Xaa Xaa Xaa Xaa Xaa
    2450                2455                2460

Xaa Xaa Xaa Xaa Xaa Xaa Xaa Xaa Xaa Xaa Xaa Xaa Xaa Xaa Xaa Xaa
2465                2470                2475                2480

Xaa Xaa Xaa Xaa Xaa Xaa Xaa Xaa Xaa Xaa Xaa Xaa Xaa Xaa Xaa Xaa
                2485                2490                2495

Xaa Xaa Xaa Xaa Xaa Xaa Xaa Xaa Xaa Xaa Xaa Xaa Xaa Xaa Xaa Xaa
```

```
            2500                2505                2510

Xaa Xaa Xaa Xaa Xaa Xaa Xaa Xaa Xaa Xaa Xaa Xaa Xaa Xaa Xaa Xaa
        2515                2520                2525

Xaa Xaa Xaa Xaa Xaa Xaa Xaa Xaa Xaa Xaa Xaa Xaa Xaa Xaa Xaa Xaa
    2530                2535                2540

Xaa Xaa Xaa Xaa Xaa Xaa Xaa Xaa Xaa Xaa Xaa Xaa Xaa Xaa Xaa Xaa
2545                2550                2555                2560

Xaa Xaa Xaa Xaa Xaa Xaa Xaa Xaa Xaa Xaa Xaa Xaa Xaa Xaa Xaa Xaa
                2565                2570                2575

Xaa Xaa Xaa Xaa Xaa Xaa Xaa Xaa Xaa Xaa Xaa Xaa Xaa Xaa Xaa Xaa
           2580                2585                2590

Xaa Xaa Xaa Xaa Xaa Xaa Xaa Xaa Xaa Xaa Xaa Xaa Xaa Xaa Xaa Xaa
        2595                2600                2605

Xaa Xaa Xaa Xaa Xaa Xaa Xaa Xaa Xaa Xaa Xaa Xaa Xaa Xaa Xaa Xaa
    2610                2615                2620

Xaa Xaa Xaa Xaa Xaa Xaa Xaa Xaa Xaa Xaa Xaa Xaa Xaa Xaa Xaa Xaa
2625                2630                2635                2640

Xaa Xaa Xaa Xaa Xaa Xaa Xaa Xaa Xaa Xaa Xaa Xaa Xaa Xaa Xaa Xaa
                2645                2650                2655

Xaa Xaa Xaa Xaa Xaa Xaa Xaa Xaa Xaa Xaa Xaa Xaa Xaa Xaa Xaa Xaa
            2660                2665                2670

Xaa Xaa Xaa Xaa Xaa Xaa Xaa Xaa Xaa Xaa Xaa Xaa Xaa Xaa Xaa Xaa
        2675                2680                2685

Xaa Xaa Xaa Xaa Xaa Xaa Xaa Xaa Xaa Xaa Xaa Xaa Xaa Xaa Xaa Xaa
    2690                2695                2700

Xaa Xaa Xaa Xaa Xaa Xaa Xaa Xaa Xaa Xaa Xaa Xaa Xaa Xaa Xaa Xaa
2705                2710                2715                2720

Xaa Xaa Xaa Xaa Xaa Xaa Xaa Xaa Xaa Xaa Xaa Xaa Xaa Xaa Xaa Xaa
                2725                2730                2735

Xaa Xaa Xaa Xaa Xaa Xaa Xaa Xaa Xaa Xaa Xaa Xaa Xaa Xaa Xaa Xaa
            2740                2745                2750

Xaa Xaa Xaa Xaa Xaa Xaa Xaa Xaa Xaa Xaa Xaa Xaa Xaa Xaa Xaa Xaa
        2755                2760                2765

Xaa Xaa Xaa Xaa Xaa Xaa Xaa Xaa Xaa Xaa Xaa Xaa Xaa Xaa Xaa Xaa
    2770                2775                2780

Xaa Xaa Xaa Xaa Xaa Xaa Xaa Xaa Xaa Xaa Xaa Xaa Xaa Xaa Xaa Xaa
2785                2790                2795                2800

Xaa Xaa Xaa Xaa Xaa Xaa Xaa Xaa Xaa Xaa Xaa Xaa Xaa Xaa Xaa Xaa
                2805                2810                2815

Xaa Xaa Xaa Xaa Xaa Xaa Xaa Xaa Xaa Xaa Xaa Xaa Xaa Xaa Xaa Xaa
            2820                2825                2830

Xaa Xaa Xaa Xaa Xaa Xaa Xaa Xaa Xaa Xaa Xaa Xaa Xaa Xaa Xaa Xaa
        2835                2840                2845

Xaa Xaa Xaa Xaa Xaa Xaa Xaa Xaa Xaa Xaa Xaa Xaa Xaa Xaa Xaa Xaa
    2850                2855                2860

Xaa Xaa Xaa Xaa Xaa Xaa Xaa Xaa Xaa Xaa Xaa Xaa Xaa Xaa Xaa Xaa
2865                2870                2875                2880

Xaa Xaa Xaa Xaa Xaa Xaa Xaa Xaa Xaa Xaa Xaa Xaa Xaa Xaa Xaa Xaa
                2885                2890                2895

Xaa Xaa Xaa Xaa Xaa Xaa Xaa Xaa Xaa Xaa Xaa Xaa Xaa Xaa Xaa Xaa
            2900                2905                2910

Xaa Xaa Xaa Xaa Xaa Xaa Xaa Xaa Xaa Xaa Xaa Xaa Xaa Xaa Xaa Xaa
        2915                2920                2925
```

```
Xaa Xaa Xaa Xaa Xaa Xaa Xaa Xaa Xaa Xaa Xaa Xaa Xaa Xaa Xaa Xaa
    2930                2935                2940

Xaa Xaa Xaa Xaa Xaa Xaa Xaa Xaa Xaa Xaa Xaa Xaa Xaa Xaa Xaa Xaa
2945                2950                2955                2960

Xaa Xaa Xaa Xaa Xaa Xaa Xaa Xaa Xaa Xaa Xaa Xaa Xaa Xaa Xaa Xaa
                2965                2970                2975

Xaa Xaa Xaa Xaa Xaa Xaa Xaa Xaa Xaa Xaa Xaa Xaa Xaa Xaa Xaa Xaa
            2980                2985                2990

Xaa Xaa Xaa Xaa Xaa Xaa Xaa Xaa Xaa Xaa Xaa Xaa Xaa Xaa Xaa Xaa
        2995                3000                3005

Xaa Xaa Xaa Xaa Xaa Xaa Xaa Xaa Xaa Xaa Xaa Xaa Xaa Xaa Xaa Xaa
    3010                3015                3020

Xaa Xaa Xaa Xaa Xaa Xaa Xaa Xaa Xaa Xaa Xaa Xaa Xaa Xaa Xaa Xaa
3025                3030                3035                3040

Xaa Xaa Xaa Xaa Xaa Xaa Xaa Xaa Xaa Xaa Xaa Xaa Xaa Xaa Xaa Xaa
                3045                3050                3055

Xaa Xaa Xaa Xaa Xaa Xaa Xaa Xaa Xaa Xaa Xaa Xaa Xaa Xaa Xaa Xaa
            3060                3065                3070

Xaa Xaa Xaa Xaa Xaa Xaa Xaa Xaa Xaa Xaa Xaa Xaa Xaa Xaa Xaa Xaa
        3075                3080                3085

Xaa Xaa Xaa Xaa Xaa Xaa Xaa Xaa Xaa Xaa Xaa Xaa Xaa Xaa Xaa Xaa
    3090                3095                3100

Xaa Xaa Xaa Xaa Xaa Xaa Xaa Xaa Xaa Xaa Xaa Xaa Xaa Xaa Xaa Xaa
3105                3110                3115                3120

Xaa Xaa Xaa Xaa Xaa Xaa Xaa Xaa Xaa Xaa Xaa Xaa Xaa Xaa Xaa Xaa
                3125                3130                3135

Xaa Xaa Xaa Xaa Xaa Xaa Xaa Xaa Xaa Xaa Xaa Xaa Xaa Xaa Xaa Xaa
            3140                3145                3150

Xaa Xaa Xaa Xaa Xaa Xaa Xaa Xaa Xaa Xaa Xaa Xaa Xaa Xaa Xaa Xaa
        3155                3160                3165

Xaa Xaa Xaa Xaa Xaa Xaa Xaa Xaa Xaa Xaa Xaa Xaa Xaa Xaa Xaa Xaa
    3170                3175                3180

Xaa Xaa Xaa Xaa Xaa Xaa Xaa Xaa Xaa Xaa Xaa Xaa Xaa Xaa Xaa Xaa
3185                3190                3195                3200

Xaa Xaa Xaa Xaa Xaa Xaa Xaa Xaa Xaa Xaa Xaa Xaa Xaa Xaa Xaa Xaa
                3205                3210                3215

Xaa Xaa Xaa Xaa Xaa Xaa Xaa Xaa Xaa Xaa Xaa Xaa Xaa Xaa Xaa Xaa
            3220                3225                3230

Xaa Xaa Xaa Xaa Xaa Xaa Xaa Xaa Xaa Xaa Xaa Xaa Xaa Xaa Xaa Xaa
        3235                3240                3245

Xaa Xaa Xaa Xaa Xaa Xaa Xaa Xaa Xaa Xaa Xaa Xaa Xaa Xaa Xaa Xaa
    3250                3255                3260

Xaa Xaa Xaa Xaa Xaa Xaa Xaa Xaa Xaa Xaa Xaa Xaa Xaa Xaa Xaa Xaa
3265                3270                3275                3280

Xaa Xaa Xaa Xaa Xaa Xaa Xaa Xaa Xaa Xaa Xaa Xaa Xaa Xaa Xaa Xaa
                3285                3290                3295

Xaa Xaa Xaa Xaa Xaa Xaa Xaa Xaa Xaa Xaa Xaa Xaa Xaa Xaa Xaa Xaa
            3300                3305                3310

Xaa Xaa Xaa Xaa Xaa Xaa Xaa Xaa Xaa Xaa Xaa Xaa Xaa Xaa Xaa Xaa
        3315                3320                3325

Xaa Xaa Xaa Xaa Xaa Xaa Xaa Xaa Xaa Xaa Xaa Xaa Xaa Xaa Xaa Xaa
    3330                3335                3340
```

```
Xaa Xaa Xaa Xaa Xaa Xaa Xaa Xaa Xaa Xaa Xaa Xaa Xaa Xaa Xaa Xaa
3345                3350                3355                3360

Xaa Xaa Xaa Xaa Xaa Xaa Xaa Xaa Xaa Xaa Xaa Xaa Xaa Xaa Xaa Xaa
                3365                3370                3375

Xaa Xaa Xaa Xaa Xaa Xaa Xaa Xaa Xaa Xaa Xaa Xaa Xaa Xaa Xaa Xaa
            3380                3385                3390

Xaa Xaa Xaa Xaa Xaa Xaa Xaa Xaa Xaa Xaa Xaa Xaa Xaa Xaa Xaa Xaa
        3395                3400                3405

Xaa Xaa Xaa Xaa Xaa Xaa Xaa Xaa Xaa Xaa Xaa Xaa Xaa Xaa Xaa Xaa
    3410                3415                3420

Xaa Xaa Xaa Xaa Xaa Xaa Xaa Xaa Xaa Xaa Xaa Xaa Xaa Xaa Xaa Xaa
3425                3430                3435                3440

Xaa Xaa Xaa Xaa Xaa Xaa Xaa Xaa Xaa Xaa Xaa Xaa Xaa Xaa Xaa Xaa
                3445                3450                3455

Xaa Xaa Xaa Xaa Xaa Xaa Xaa Xaa Xaa Xaa Xaa Xaa Xaa Xaa Xaa Xaa
            3460                3465                3470

Xaa Xaa Xaa Xaa Xaa Xaa Xaa Xaa Xaa Xaa Xaa Xaa Xaa Xaa Xaa Xaa
        3475                3480                3485

Xaa Xaa Xaa Xaa Xaa Xaa Xaa Xaa Xaa Xaa Xaa Xaa Xaa Xaa Xaa Xaa
    3490                3495                3500

Xaa Xaa Xaa Xaa Xaa Xaa Xaa Xaa Xaa Xaa Xaa Xaa Xaa Xaa Xaa Xaa
3505                3510                3515                3520

Xaa Xaa Xaa Xaa Xaa Xaa Xaa Xaa Xaa Xaa Xaa Xaa Xaa Xaa Xaa Xaa
                3525                3530                3535

Xaa Xaa Xaa Xaa Xaa Xaa Xaa Xaa Xaa Xaa Xaa Xaa Xaa Xaa Xaa Xaa
            3540                3545                3550

Xaa Xaa Xaa Xaa Xaa Xaa Xaa Xaa Xaa Xaa Xaa Xaa Xaa Xaa Xaa Xaa
        3555                3560                3565

Xaa Xaa Xaa Xaa Xaa Xaa Xaa Xaa Xaa Xaa Xaa Xaa Xaa Xaa Xaa Xaa
    3570                3575                3580

Xaa Xaa Xaa Xaa Xaa Xaa Xaa Xaa Xaa Xaa Xaa Xaa Xaa Xaa Xaa Xaa
3585                3590                3595                3600

Xaa Xaa Xaa Xaa Xaa Xaa Xaa Xaa Xaa Xaa Xaa Xaa Xaa Xaa Xaa Xaa
                3605                3610                3615

Xaa Xaa Xaa Xaa Xaa Xaa Xaa Xaa Xaa Xaa Xaa Xaa Xaa Xaa Xaa Xaa
            3620                3625                3630

Xaa Xaa Xaa Xaa Xaa Xaa Xaa Xaa Xaa Xaa Xaa Xaa Xaa Xaa Xaa Xaa
        3635                3640                3645

Xaa Xaa Xaa Xaa Xaa Xaa Xaa Xaa Xaa Xaa Xaa Xaa Xaa Xaa Xaa Xaa
    3650                3655                3660

Xaa Xaa Xaa Xaa Xaa Xaa Xaa Xaa Xaa Xaa Xaa Xaa Xaa Xaa Xaa Xaa
3665                3670                3675                3680

Xaa Xaa Xaa Xaa Xaa Xaa Xaa Xaa Xaa Xaa Xaa Xaa Xaa Xaa Xaa Xaa
                3685                3690                3695

Xaa Xaa Xaa Xaa Xaa Xaa Xaa Xaa Xaa Xaa Xaa Xaa Xaa Xaa Xaa Xaa
            3700                3705                3710

Xaa Xaa Xaa Xaa Xaa Xaa Xaa Xaa Xaa Xaa Xaa Xaa Xaa Xaa Xaa Xaa
        3715                3720                3725

Xaa Xaa Xaa Xaa Xaa Xaa Xaa Xaa Xaa Xaa Xaa Xaa Xaa Xaa Xaa Xaa
    3730                3735                3740

Xaa Xaa Xaa Xaa Xaa Xaa Xaa Xaa Xaa Xaa Xaa Xaa Xaa Xaa Xaa Xaa
3745                3750                3755                3760

Xaa Xaa Xaa Xaa Xaa Xaa Xaa Xaa Xaa Xaa Xaa Xaa Xaa Xaa Xaa Xaa
```

```
                3765                3770                3775

Xaa Xaa Xaa Xaa Xaa Xaa Xaa Xaa Xaa Xaa Xaa Xaa Xaa Xaa Xaa Xaa
            3780                3785                3790

Xaa Xaa Xaa Xaa Xaa Xaa Xaa Xaa Xaa Xaa Xaa Xaa Xaa Xaa Xaa Xaa
        3795                3800                3805

Xaa Xaa Xaa Xaa Xaa Xaa Xaa Xaa Xaa Xaa Xaa Xaa Xaa Xaa Xaa Xaa
    3810                3815                3820

Xaa Xaa Xaa Xaa Xaa Xaa Xaa Xaa Xaa Xaa Xaa Xaa Xaa Xaa Xaa Xaa
3825                3830                3835                3840

Xaa Xaa Xaa Xaa Xaa Xaa Xaa Xaa Xaa Xaa Xaa Xaa Xaa Xaa Xaa Xaa
                3845                3850                3855

Xaa Xaa Xaa Xaa Xaa Xaa Xaa Xaa Xaa Xaa Xaa Xaa Xaa Xaa Xaa Xaa
            3860                3865                3870

Xaa Xaa Xaa Xaa Xaa Xaa Xaa Xaa Xaa Xaa Xaa Xaa Xaa Xaa Xaa Xaa
        3875                3880                3885

Xaa Xaa Xaa Xaa Xaa Xaa Xaa Xaa Xaa Xaa Xaa Xaa Xaa Xaa Xaa Xaa
    3890                3895                3900

Xaa Xaa Xaa Xaa Xaa Xaa Xaa Xaa Xaa Xaa Xaa Xaa Xaa Xaa Xaa Xaa
3905                3910                3915                3920

Xaa Xaa Xaa Xaa Xaa Xaa Xaa Xaa Xaa Xaa Xaa Xaa Xaa Xaa Xaa Xaa
                3925                3930                3935

Xaa Xaa Xaa Xaa Xaa Xaa Xaa Xaa Xaa Xaa Xaa Xaa Xaa Xaa Xaa Xaa
            3940                3945                3950

Xaa Xaa Xaa Xaa Xaa Xaa Xaa Xaa Xaa Xaa Xaa Xaa Xaa Xaa Xaa Xaa
        3955                3960                3965

Xaa Xaa Xaa Xaa Xaa Xaa Xaa Xaa Xaa Xaa Xaa Xaa Xaa Xaa Xaa Xaa
    3970                3975                3980

Xaa Xaa Xaa Xaa Xaa Xaa Xaa Xaa Xaa Xaa Xaa Xaa Xaa Xaa Xaa Xaa
3985                3990                3995                4000

Xaa Xaa Xaa Xaa Xaa Xaa Xaa Xaa Xaa Xaa Xaa Xaa Xaa Xaa Xaa Xaa
                4005                4010                4015

Xaa Xaa Xaa Xaa Xaa Xaa Xaa Xaa Xaa Xaa Xaa Xaa Xaa Xaa Xaa Xaa
            4020                4025                4030

Xaa Xaa Xaa Xaa Xaa Xaa Xaa Xaa Xaa Xaa Xaa Xaa Xaa Xaa Xaa Xaa
        4035                4040                4045

Xaa Xaa Xaa Xaa Xaa Xaa Xaa Xaa Xaa Xaa Xaa Xaa Xaa Xaa Xaa Xaa
    4050                4055                4060

Xaa Xaa Xaa Xaa Xaa Xaa Xaa Xaa Xaa Xaa Xaa Xaa Xaa Xaa Xaa Xaa
4065                4070                4075                4080

Xaa Xaa Xaa Xaa Xaa Xaa Xaa Xaa Xaa Xaa Xaa Xaa Xaa Xaa Xaa Xaa
                4085                4090                4095

Xaa Xaa Xaa Xaa Xaa Xaa Xaa Xaa Xaa Xaa Xaa Xaa Xaa Xaa Xaa Xaa
            4100                4105                4110

Xaa Xaa Xaa Xaa Xaa Xaa Xaa Xaa Xaa Xaa Xaa Xaa Xaa Xaa Xaa Xaa
        4115                4120                4125

Xaa Xaa Xaa Xaa Xaa Xaa Xaa Xaa Xaa Xaa Xaa Xaa Xaa Xaa Xaa Xaa
    4130                4135                4140

Xaa Xaa Xaa Xaa Xaa Xaa Xaa Xaa Xaa Xaa Xaa Xaa Xaa Xaa Xaa Xaa
4145                4150                4155                4160

Xaa Xaa Xaa Xaa Xaa Xaa Xaa Xaa Xaa Xaa Xaa Xaa Xaa Xaa Xaa Xaa
                4165                4170                4175

Xaa Xaa Xaa Xaa Xaa Xaa Xaa Xaa Xaa Xaa Xaa Xaa Xaa Xaa Xaa Xaa
            4180                4185                4190
```

-continued

```
Xaa Xaa Xaa Xaa Xaa Xaa Xaa Xaa Xaa Xaa Xaa Xaa Xaa Xaa Xaa Xaa
        4195                4200                4205

Xaa Xaa Xaa Xaa Xaa Xaa Xaa Xaa Xaa Xaa Xaa Xaa Xaa Xaa Xaa Xaa
    4210                4215                4220

Xaa Xaa Xaa Xaa Xaa Xaa Xaa Xaa Xaa Xaa Xaa Xaa Xaa Xaa Xaa Xaa
4225                4230                4235                4240

Xaa Xaa Xaa Xaa Xaa Xaa Xaa Xaa Xaa Xaa Xaa Xaa Xaa Xaa Xaa Xaa
                4245                4250                4255

Xaa Xaa Xaa Xaa Xaa Xaa Xaa Xaa Xaa Xaa Xaa Xaa Xaa Xaa Xaa Xaa
            4260                4265                4270

Xaa Xaa Xaa Xaa Xaa Xaa Xaa Xaa Xaa Xaa Xaa Xaa Xaa Xaa Xaa Xaa
        4275                4280                4285

Xaa Xaa Xaa Xaa Xaa Xaa Xaa Xaa Xaa Xaa Xaa Xaa Xaa Xaa Xaa Xaa
    4290                4295                4300

Xaa Xaa Xaa Xaa Xaa Xaa Xaa Xaa Xaa Xaa Xaa Xaa Xaa Xaa Xaa Xaa
4305                4310                4315                4320

Xaa Xaa Xaa Xaa Xaa Xaa Xaa Xaa Xaa Xaa Xaa Xaa Xaa Xaa Xaa Xaa
                4325                4330                4335

Xaa Xaa Xaa Xaa Xaa Xaa Xaa Xaa Xaa Xaa Xaa Xaa Xaa Xaa Xaa Xaa
            4340                4345                4350

Xaa Xaa Xaa Xaa Xaa Xaa Xaa Xaa Xaa Xaa Xaa Xaa Xaa Xaa Xaa Xaa
        4355                4360                4365
```